United States Patent Office 3,436,737
Patented Apr. 1, 1969

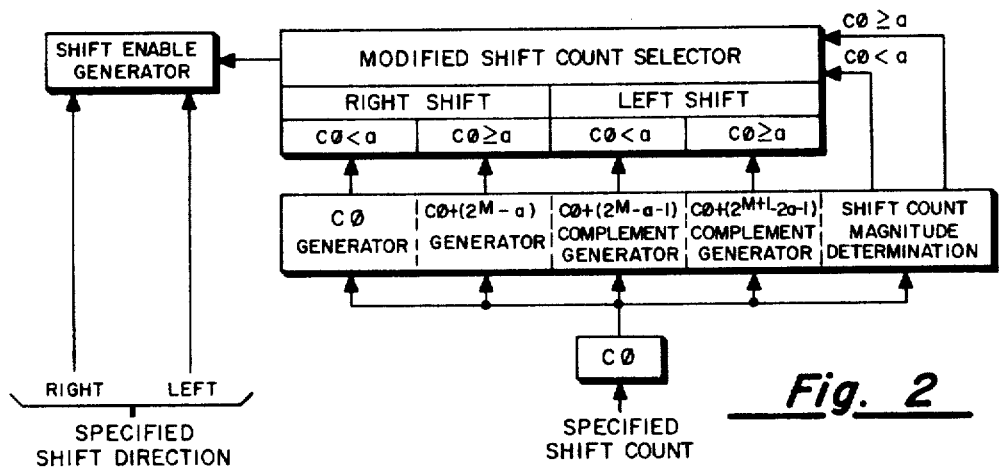
*Fig. 2*
| f | j | k | b | y |
|---|---|---|---|---|
| $2^{29}$ ---- $2^{24}$ | $2^{23}$ - $2^{21}$ | $2^{20}$ - $2^{18}$ | $2^{17}$ - $2^{15}$ | $2^{14}$ ---------------- $2^0$ |
INSTRUCTION WORD FORMAT
*Fig. 3*
 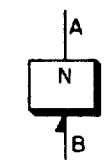
| A | B |
|---|---|
| 1 | 0 |
| 0 | 1 |
*Fig. 4a*
 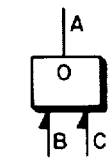
| A | B | C |
|---|---|---|
| 1 | 0 | 0 |
| 1 | 0 | 1 |
| 1 | 1 | 0 |
| 0 | 1 | 1 |
*Fig. 4b*
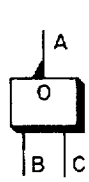 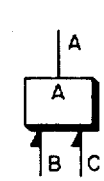
| A | B | C |
|---|---|---|
| 1 | 0 | 0 |
| 0 | 0 | 1 |
| 0 | 1 | 0 |
| 0 | 1 | 1 |
*Fig. 4c*
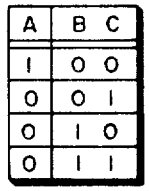
| A | B | C | D |
|---|---|---|---|
| 0 | 1 | 1 | — |
| 0 | — | — | 1 |
*Fig. 4d*
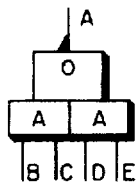 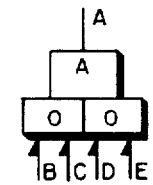
| A | B | C | D | E |
|---|---|---|---|---|
| 0 | 1 | 1 | — | — |
| 0 | — | — | 1 | 1 |
*Fig. 4e*
▬ = POS = "0" ≅ GROUND
— = NEG = "1" ≅ -3 VOLTS

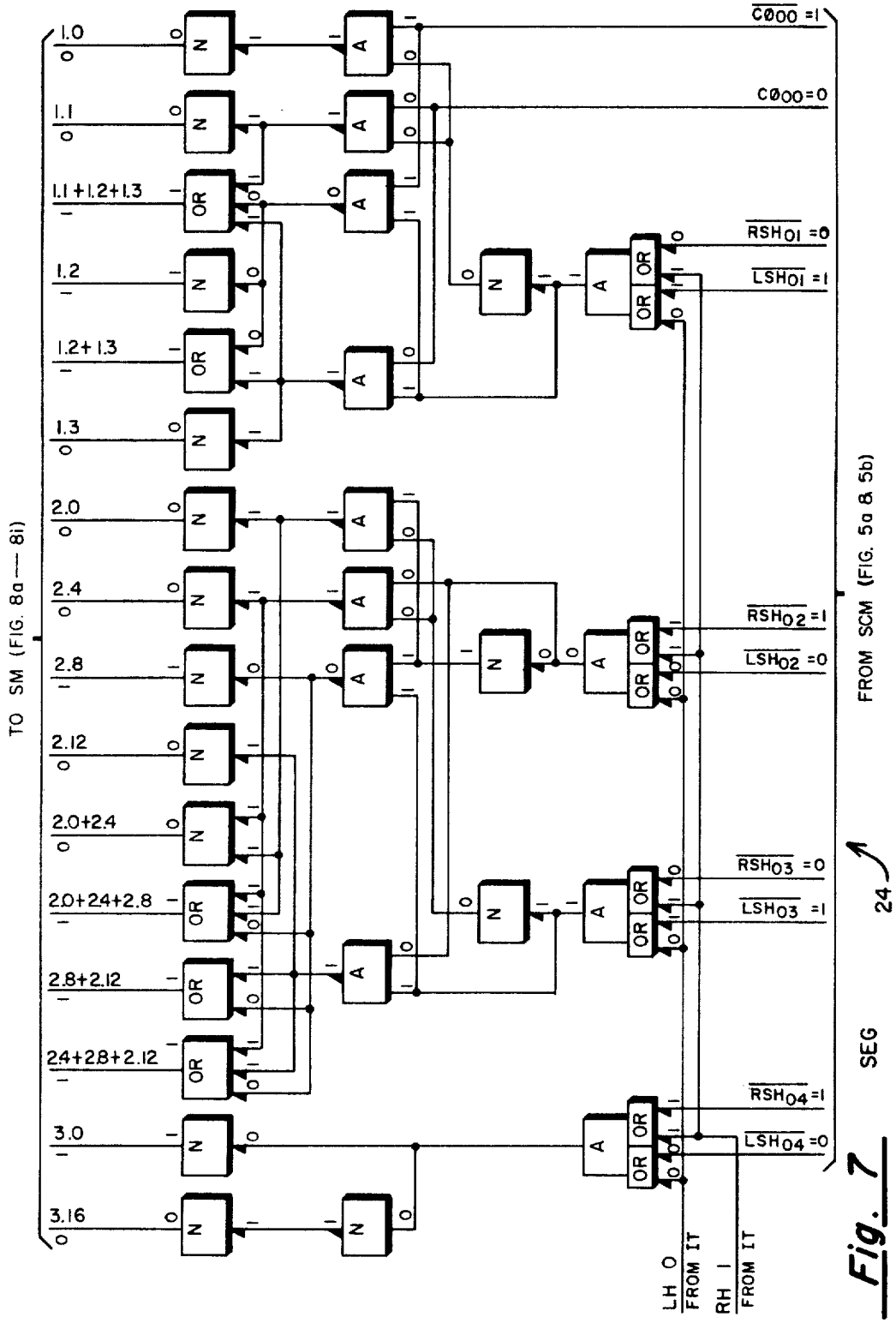

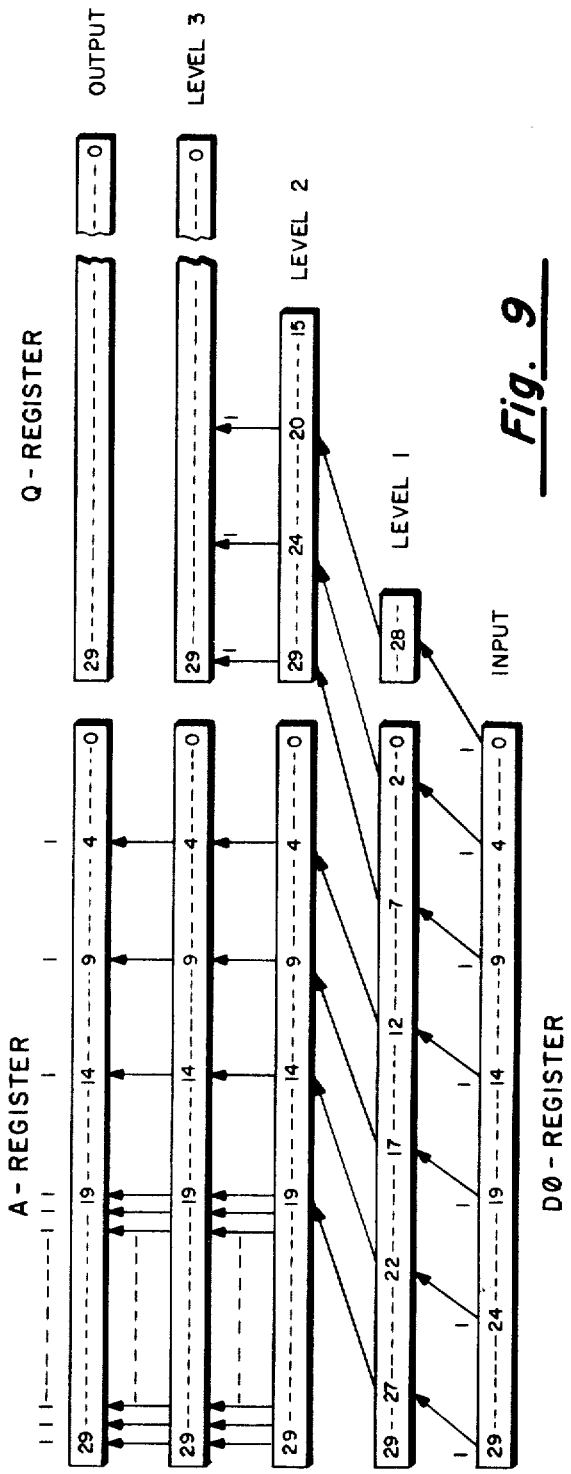

3,436,737
SHIFT ENABLE ALGORITHM
IMPLEMENTATION MEANS
Gary J. Iverson, White Bear Lake, and David M. Collins,
St. Paul Park Village, Minn., assignors to Sperry Rand
Corporation, New York, N.Y., a corporation of
Delaware
Filed Jan. 30, 1967, Ser. No. 612,663
Int. Cl. G11b 13/00
U.S. Cl. 340—172.5                                15 Claims

ABSTRACT OF THE DISCLOSURE

A shift enable signal generator for the arithmetic section of a digital computer whereby all possible shift count modifications are performed in parallel with the determination of the particular modification designated by the computer's instruction word.

BACKGROUND OF THE INVENTION

The idealized concept of a digital computer consists of four basic units: arithmetic, control, memory and input-output. In the arithmetic unit there are temporary storage locations or registers that receive data from the memory unit. As the signals indicative of a data word are transmitted from the memory unit to an arithmetic register or back again it passes through logical gating networks. In these gating networks the data signals are transformed or manipulated according to the operation being executed as determined by the control unit. Thus, it is possible to conceive of a digital computer as consisting of a temporary storage means and a permanent storage means with gating networks in between. When data words are transmitted from the permanent storage means, the computer memory, through the gating networks to the temporary storage means, the arithmetic unit registers, and then back again to the gating networks, two general methods of transmitting the data are utilized; serial or parallel, each method designating the type of digital computer involved.

The shifting network of the arithmetic unit of a parallel computer usually consists of a plurality of registers arranged in "ranks," or levels, whereby the binary digits (bits of the multi-bit word, or operand) that are to be operated upon in accordance with the instruction code specified by the instruction word held in the Instruction Register are shifted in parallel through the ranks of the shifting network. The path that the operand is shifted through the ranks of the shifting network is in accordance with shift enable signals that are specified by the particular instruction code and shift count that are designated by the computer's programmed instruction as stored in the computer's memory. The shift enable signals are generated in a translator that generates in a plurality of pulse times the necessary gating signals for the determination of the shift operation that is specified by the particular instruction code. Such generated shift enable signals generally constitute at least one of a group of possible shift enable signals per rank. One of the possible shift enable signals is coupled to each rank of the shifting network whereby the operand is shifted through the ranks one enable pulse period at a time. Other methods involve the use of a multiple rank shifting network that is programmed, or set-up, through gating networks during a series of pulse periods in a particular shifting path whereby the operand passes through the programmed shifting network in one pulse time. As the "set-up" time occupied by the plurality of pulse periods required by these prior art methods may constitute a major portion of the computer's cycle time, it is desirable that this set-up time be decreased thereby permitting more shifting operations per unit time.

SUMMARY OF THE INVENTION

The present invention decreases the set-up time required by prior art devices by utilizing a Shift Count Modifier and a Shift Enable Generator that implement a shift enable algorithm for generating all possible shift count modifications in parallel, i.e., concurrently in time, with the determination of a specific modification as designated by the particular instruction code.

In the preferred embodiment of the present invention the multi-bit shift count is gated from the shift count portion of the Instruction Register into the Shift Count Register simultaneously with the gating of the instruction code into the Instruction Translator. The Instruction Translator determines the nature of the shift as specified by the instruction code, i.e., left-wise or right-wise. The multi-bit shift count, through associated circuitry, emits in parallel a 5-bit binary code that is coupled to the Shift Enable Generator. The shift direction information from the Instruction Translator acts upon the 5-bit code generating three shift enable signals that are coupled to each rank of a three rank right-wise shift matrix or Shifter. In the illustrated embodiment operand length is that of a 30-bit word, bits $2^{29}$–$2^0$, that may be shifted from a 30-bit input register through first and second ranks into a double length or 60-bit third rank. The Shifter arrangement is assumed to be well-known and shifts in a well-known manner; the possible shift enable signals to the first rank enable the right-wise shifting in increments of 0, 1, 2 or 3 bit places, the possible shift enable signals to the second rank enable the right-wise shifting in increments of 0, 4, 8 or 12 bit places, while the possible shift enable signals to the third rank enable the right-wise shifting in increments of 0 or 16 bit places. This combination of shift enable signals at the three ranks of the Shifter permits the shifting of the operand from 0 to 60 places. Left-wise shifts are performed in much the same manner as the right-wise shifts with the Shift Count Modifier modifying the left shift into a right shift by merely shifting the operand right-wise sufficient places to be equivalent to the specified left-wise shift; i.e., in a 30-bit register a 10-bit end-around right-wise shift is equivalent to a 20-bit end-around left-wise shift.

Accordingly, it is a primary object of the present invention to provide a shift enable algorithm implementation means that provides an improved shifting operation.

It is a further object of the present invention to provide a method of generating all possible shift count modifications in parallel with the determination of the one modification that is specified by the instruction code and the shift count.

BRIEF DESCRIPTION OF THE DRAWINGS

FIG. 2 is a block diagram of the Shift Count Modifier logic of the present invention;

FIG. 3 is an illustration of the Instruction Word format used by the system of FIG. 1;

FIGS. 4a–4e are the logic elements and their truth tables of the illustrated embodiment;

FIG. 7 is a block diagram of the Shift Enable Generator;

FIG. 8 is a block diagram of the arrangement of FIGS. 8a–8i;

FIG. 9 is a symbolic diagram of the flow of an operand through the Shifter with the Instruction Code 02 Right Shift A with a shift count of 10.

THEORY OF OPERATION

The present invention relates to a shift algorithm and the associated hardware that is required to perform high-speed operations on binary operands. The algorithm described utilizes some of the hardware that is normally included in a Central Processor arithmetic section. The additional hardware includes a shifting device, or Shifter and the logic that is required to generate and couple the correct enables to the Shifter in order to perform a variety of shift operations. The techniques developed in this Theory of Operation are completely general and may be applied to most any shift operation utilizing any length operands. The following Table A contains a list of those abbreviations used throughout this discussion.

Table A
LIST OF ABBREVIATIONS $a$—The number of bits in a single length operand
$\beta$—Binary operator
    $\beta = I$: $\beta(x) = x$
    $\beta = N$: $\beta(x) = x'$ (one's complement of $x$)
$d$—Shift count modification constant
$E$—Modified shift count specifying the shift to be performed by the Shifter
$K$—Shift count defining the shift performed as the Shifter output is gated
    $K > 0$: right shift
    $K < 0$: left shift
$M$—The number of bit positions required to represent the maximum shift possible in the Shifter
$S$—The number of bit positions an operand is shifted:
    $S > 0$: right shift
    $S < 0$: left shift
$SM$—Shifter
$SL$—Lower half of the Shifter output
$SU$—Upper half of the Shifter output

Figure 1:
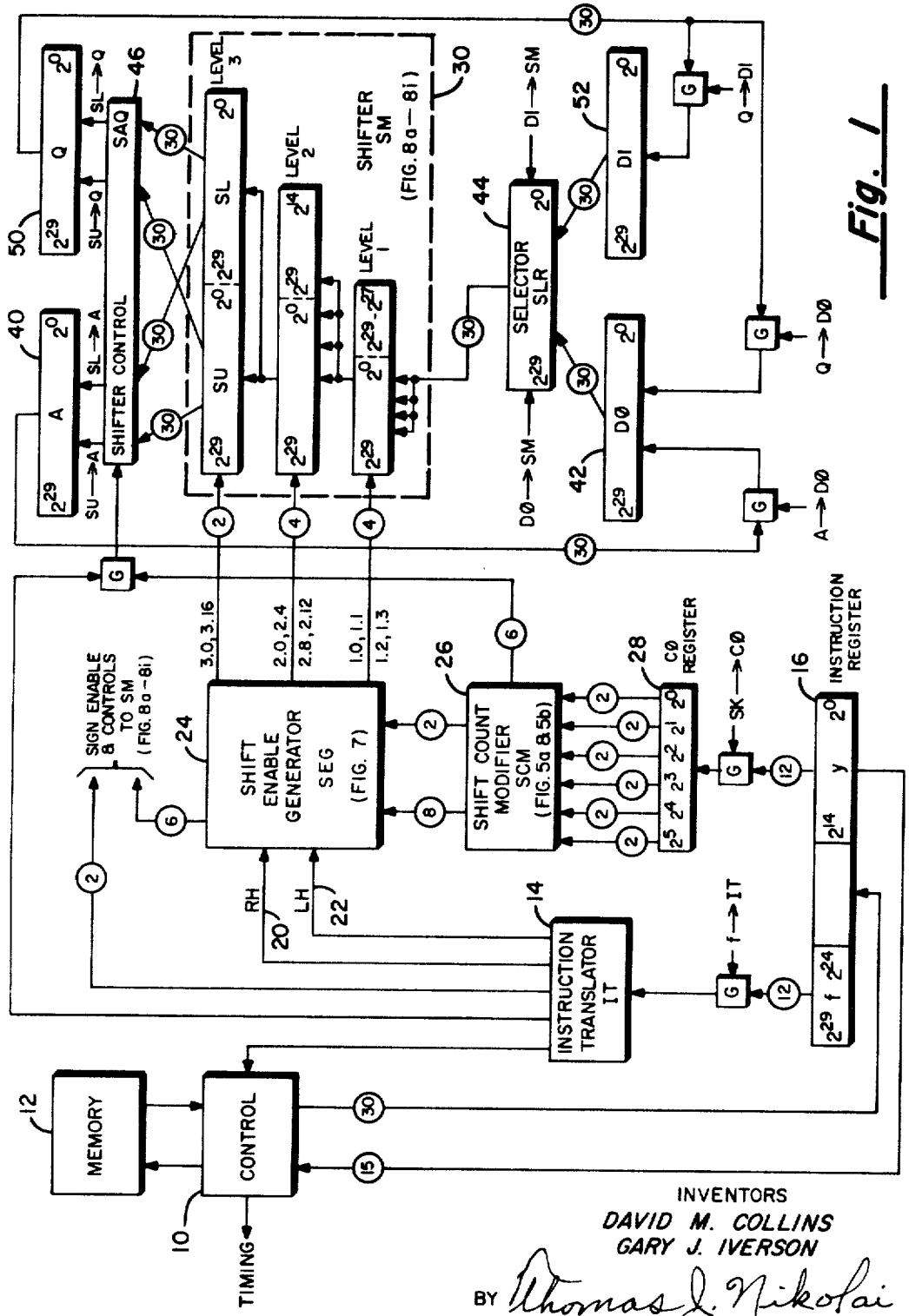
FIG. 1 is a block diagram of an electonic data processing system incorporating the present invention.

*Shift logic.*—FIG. 1 is an illustration of the functional block diagram of the shift logic of the present invention. The logic shown (plus the required control logic) is capable of performing left and right shifts, circular and end-off on both single-and double-length operands initially contained in the A and/or Q registers. The following paragraphs functionally describe each block in FIG. 1.

*Shifter.*—The Shifter is a logic network capable of shifting a single-length operand unidirectionally into any position in a double-length operand. The output is divided into two halves designated "Shifter Upper" SU and "Shifter Lower" SL. The direction of shift is not critical; however, to better visualize the shift operation, assume the Shifter always shifts to the right, a shift of zero produces the input operand unshifted at the SU output and zeros at the SL output, and a shift count equal to the number of input bits results in the input data at SL and zeros at SU. Also, assume the maximum shift is equal to the length of a single-length operand ($a$).

*Registers*—The registers shown in FIG. 1 function as follows:

A, Q—Either or both contain the original operand prior to shifting and the shifted operand after shifting. Each is a full word in length.

$D\emptyset$, $D1$—Full word, volatile storage registers providing input operands to the Shifter during the shift operation.

$C\emptyset$—Shift Count Register containing the unmodified shift count that defines the number of bit positions the operand is to be shifted to the right or to the left. The minimum length of $C\emptyset$ is determined by the number of bits that is required to represent the maximum allowable shift count (usually twice the operand length less one).

*Shift Count Modifier.*—The Shift Count Modifier logic modifies the specific shift count to enable a variety of shift operations to be performed using the Shifter.

*Shift Enable Generator.*—The Shift Enable Generator logic converts the modified shift count to a form usable by the Shifter. In the illustrated embodiment of FIG. 1 the Shifter is a standard multi-layer shift matrix, and the Shift Enable Generator consists of a translator for each Shifter level plus the circuitry necessary to provide the required drive capability.

*Basic shift algorithm.*—The key to the shift algorithm described herein is the determination of the modification to the specified shift count to perform single and double-length, right and left shift operations using the illustrated, uni-directional Shifter. One of the simplest forms this conversion can take is:

$$S = \beta(C\emptyset + d) + K = E + K$$

Where $S$ = the number of positions the operand is to be shifted
    $S > 0$: right shift
    $S < 0$: left shift
$C\emptyset$ = the specified shift count.
$d$ = shift count modification constant added to $C\emptyset$ to produce the shift count that controls the Shifter.
$K$ = correction shift required to complete the specified shift operation. The algebraic signs of $S$ and $K$ have the same significance.
$E$ = the number of positions the operand is shifted by the Shifter. The algebraic signs of $S$ and $E$ have the same significance.
$\beta$ = binary operator operating on the argument contained in parentheses following the operator.

The following paragraphs derive expressions for $d$, $E$, and $K$ and define $\beta$. Also included is an explanation of how the various shift operations are performed and how the Shift Count Modifier may be implemented. All arithmetic in the following derivations is two's complement and performed in modulo $2^M$.

*Right shifts.*—Since it is assumed that the Shifter shifts operands to the right, i.e., is a right Shifter, right shifts less than the operand length $a$ can be performed directly by the Shifter using the specified shift count $C\emptyset$. Therefore:

$$S = C\emptyset \quad (C\emptyset < a)$$

and:

$$d = 0$$
$$K = 0$$
$$\beta = I \text{ (identity operator, } I(X) = X)$$
$$E = C\emptyset$$

When the specified shift count is greater than the number of bits in the shift operand, a fixed constant K is subtracted from the shift count before generating the shift enables. The Shifter output is then right shifted by an amount equal to this constant.

$$S = C\emptyset \, (C\emptyset > a)$$
$$= (C\emptyset - a) + a$$
$$= [C\emptyset + (2^M - a)] + a \text{ (see below)}$$

and:

$$d = (2^M - a) \geq 0 \text{ (modulo } 2^M\text{)}$$
$$K = +a$$
$$\beta = I$$
$$E = C\emptyset + (2^M - a)$$

Since the arithmetic is performed modulo $2^M$, the addition (or subtraction) of $2^M$ to only one side of the equation is permissible. Only the least-significant $M$ bits of the shift count enter into the arithmetic, the more-significants bits (or bit) are used only to determine whether the shift count is greater than or less than $a$.

When the shift count is equal to the operand word length $a$, either expression for S is valid if the Shifter is capable of a maximum right shift of $a$. A Shifter capability of a $-1$ position shifts may also be used; however, in this case the second expression for $S$ ($C\emptyset > a$ or, more correctly, $C\emptyset \geq a$) must be used.

*Left shifts.*—Left shifts can be implemented in the right Shifter as follows:

Form the difference between the shift count and some constant,
V, chosen such that:
$$V \geq C\emptyset$$

Shift the operand right $V - C\emptyset$ positions.
Gate the Shifter output in such a way as to effect a left shift of V positions.

The final shift will be the desired number of places to the left as the following expression verifies:
$$S = (V - C\emptyset) - V = -C\emptyset$$

The constant V is chosen to be equal to the number of bits in the single- or double-length operand when the shift count is less than or greater than the number of bits in the single-length operand, respectively.

When the shift count is less than the number of bits in the single-length operand, the following expressions describe the left-shift operation.

$$S = -C\emptyset (C\emptyset < a)$$
$$= (a - C\emptyset) - a$$
$$= -(C\emptyset - a) - a$$
$$= -[C\emptyset + (2^M - a)] - a$$
$$= \{(2^M - 1) - [C\emptyset + (2^M - a - 1)]\} - a$$
$$= [C\emptyset + (2^M - a - 1)]' - a$$

and:
$$d = (2^M - a - 1)$$
$$K = -a$$

$\beta = N$ (one's complement operator:
$$N(x) = x' = (2^m - 1) - x)$$
$$E = [C\emptyset + (2^M - a - 1]'$$

The operand is right shifted by the Shifter a number of bit positions equal to the one's complement of
$$(C\emptyset + 2^M - a - 1)$$
and the Shifter output is *left-shifted* ($K < 0$) a number of positions equal to the number of bits in the single-length operand.

When the shift count is greater than the single-length operand length, the constant V is selected as the number of bits in the double-length operand $2a$. The shift operation is described as follows:

$$S = -C\emptyset (C\emptyset > a)$$
$$= (2a - C\emptyset) - 2a$$
$$= -(C\emptyset - 2a) - 2a$$
$$= -[C\emptyset + (2^{M+1} - 2a)] - 2a$$
$$= \{(2^M - 1) - [C\emptyset (2^{M+1} - 2a - 1)]\} - 2a$$
$$= [C\emptyset + (2^{M+1} - 2a - 1)]' - 2a$$

and:
$$d = (2^{M+1} - 2a)$$
$$K = -2a$$
$$\beta = N$$

$$E = [C\emptyset + (2^{M+1} - 2a - 1)]'$$

The subtraction of $2^{M+1}$ instead of $2^M$ in the fourth equation for S is necessary to ensure that the term in parentheses is positive since $2a$ will always be less than $2^{M+1}$.

When the shift count is equal to the number of bits in the single-length operand, the first expression for
$$S \ (C\emptyset < a)$$
gives:
$$S = [a + (2^M - a - 1)]' - a$$
$$= (2^M - 1)' - a = -a(2^M - 1)' = (11 \ldots 11_2)' = 0$$

with:
$$E = 0 \text{ and } K = -a$$

and the second expression for $S(C\emptyset > a)$ gives:
$$S = [a + (2^{M+1} - 2a - 1)]' - 2a$$
$$= [(2^{M+1} - 1) - a] - 2a = (a')' - 2a = -a$$
with
$$E = +a \text{ and } K = -2a$$

Both expressions give the correct result; however, the second one can be used only if the Shifter can produce a shift equal to or greater than the number of bits in the single-length operand.

An interesting result occurs when a left shift is performed with a shift count of zero. The appropriate expression for S gives:

$$S = [0 + (2^M - a - 1)]' - a$$
$$= [(2^M - 1) - a]' - a$$
$$= (a')' - a = a - a = 0$$

with:
$$E = +a \text{ and } K = -a$$

With a Shifter capable of a full word shift, a left shift of zero is performed by the Shifter shifting the operand a full word to the right and the gating of the Shifter output effectively shifts the operand back a full word to the left. The net result is a shift of zero. When the Shifter is not capable of a full word transfer, the above sequence must be blocked and the shift operations aborted.

*Shift count modification.*—The form of the general shift equation (shown below) indicates that the most direct $$S = \beta(C\emptyset + d) + K = E + K$$
$$E = \beta(C\emptyset + d)$$

sequence to generate the modified shift count is as follows:

Determine the value of $d$ from the magnitude of the shift count and the specified direction of shift.
Form the modulo $2^M$ (two's complement) sum of $C\emptyset$ and $d$.
Operate on the resulting sum according to the operator $\beta$ determined only by the specified direction of shift as follows:
RIGHT SHIFT: $\beta = I$ (no operation, $E = C\emptyset + d$)
LEFT SHIFT: $\beta = N$ (one's complement,
$$E = [C\emptyset + d]')$$

Transmit the resulting modified shift count to the Shift Enable Generator and initiate the actual shift operation.

The most obvious method to implement this sequence is to perform the $C\emptyset + d$ addition in a conventional adder (probably one already available, such as the index adder or the floating-point characteristic adder). This method requires setting one adder input equal to $d$, the other to the shift count and transmitting either the adder output or the one's complement of the adder output to the shift enable generator. The main advantage of this method is the use of existing hardware to perform the shift count modification.

Using an available adder may not be possible, and this may require additional time while waiting for an adder to be available, or may hold up an unrelated operation until the shift logic is finished with the adder. Since the width of the adder required is normally quite narrow (a 6 bit adder will accommodate a 63-bit Shifter with a 64-bit wide input), any available adder would probably be several times wider than necessary. Propagation time through such an adder would surely be slower than a small adder designed for the maximum add width required. Additional speed-up would be possible either by building a highly specialized adder capable of selecting only the modification constants ($d$'s usually only three values required) or by building three specialized adders each with one input set to a particular value of $d$.

Each time a shift count is received, the three specialized adders (or, more accurately, incrementers) generate all three possible modified shift counts in parallel. Simultaneously, the magnitude of the specified shift count is determined and used, along with the specified shift direction, to select the output of one of the three adders or the specified shift count as an input to the Shift Count Generator (see FIG. 2). In FIG. 2 the three adders and the shift count magnitude determination logic are shown as parts of one functional block because it is usually possible for these four networks to share some internal logic functions. It is also probable that logic functions may be shared with the iteration counter and the count checking logic (usually included with the arithmetic logic for use during multiply and divide operations).

*Shift variations.*—Preceding sections discuss methods of right shifting a single-length operand into the proper position in a double-length operand such that a shift of one or two operand lengths either to the right or to the left completes the specified shift operation. This section describes the techniques and sequences necessary to perform various types of shift operations such as end-off and circular shifts with and without sign extension and insertion on single- and double-length operands. The sequences of operations required to implement the shift variations that are briefly discussed in this section are more fully explained in Shift Sequences.

*Double-length shifts.*—Double-length shifts are performed by dividing the operand to be shifted into two single-length operands, each of which is shifted separately. The two halves of the shifted operand are properly aligned as they are gated from the Shifter.

*End-off shifts.*—"End-off" shifts are defined as shift operations whereby bits shifted off the end of the operand are discarded. Both left and right end-off shifts are possible. Single-length end-off shifts are implemented by discarding half (or all if $C\emptyset \geq a$) of the Shifter output. Double-length shifts are implemented by discarding one, two, or three halves of the two Shifter outputs depending on the magnitude of the shift count.

*Circular shifts.*—"Circular" shifts are defined as shift operations whereby bits shifted off one end of the operand are inserted at the other. Circular shifts are usually limited to left shifts. Single circular shifts are implemented by gating *both* halves of the Shifter output into a single-length register. Double-length circular shifts are implemented by gating one Shifter output directly into a double-length register and gating the other Shifter output in such a way that the lower half of the Shifter output is gated into the upper half of the register and the upper half of the Shifter output is gated into the lower half of the register (cross transfer). Selection of which output is cross transferred depends on the magnitude of the shift count.

*Sign extension.*—When an end-off right shift is performed, the vacated bit-positions may be either zero-filled or sign-filled. The logic to implement sign and zero filling can be included in the Shifter in such a way that the vacated, most-significant bit-positions in the Shifter can be filled with either binary ones or zeros as specified by the shift control logic.

*Sign insertion.*—In some instances it is necessary to perform a left-shift, end-off with the vacated, least-significant bit positions filled with sign bits. The most common use for such a shift is during scaling and normalizing operations. In these cases, the operand to be shifted contains sign bits in the most-significant $|S|+1(|S|=$the magnitude of the left shift count$)$ bit-positions contain sign bits; therefore, a conventional circular left shift produces the desired result. In other applications it may be necessary to design the Shifter such that the least-significant unfilled bit-positions in the Shifter are filled with either binary ones or zeros as specified by the shift control logic.

*Shift sequences.*—Tables B and C list the sequences of operations required to perform left and right, single- and double-length, end-off and circular shifts. Tables D and E are tables of shift equation constants and examples of each type of shift, respectively. It is assumed that both the initial and final single-length operands are contained in the A Register (see FIG. 1) and double-length operands are contained in the combined AQ Registers. It is also possible to shift single-length operands contained with the Q Register; however, this case is not included in the sequences of Tables B and C.

*End-off shifts.*—Table B illustrates the sequences of operations to perform both left and right end-off shifts. The shift enable E listed is the shift count required by a single-length, right shifter capable of a full-length shift and applies to both A and AQ shifts.

Those operations listed in parentheses are applicable only when sign extension is specified (right shifts only). Similar operations could be performed during left shifts when sign insertion is specified. Single end-off shifts greater than the word length result in all zeros (or sign bits) in the final operand. In these cases the Shifter output is not used and the shift operation is completed by either clearing or sign-filling A. The final shift (indicated by K in the shift equation) is implemented by the gating paths out of the Shifter.

*Circular shifts.*—Table C illustrates the sequences of operations to perform both left and right circular shifts. Each operand (or operand half) is positioned in a double-length operand (Shifter output) such that one-half holds the part of the original operand that is shifted out of the operand and the other half holds the remaining portion. Single-length circular shifts are accomplished by gating both halves of the Shifter output into a single-length register. Since the original operand is positioned as a continuous portion of a double-length operand, there is never any data overlap when the two halves are gated into a single-length register. Because the shift is circular and the gating shift (represented by K in the general shift equation) is always an integral number of full word shifts or is non-existent, the gating shift is trival because a full word circular shift leaves the operand unchanged. The same is true for double-length operands only when the specified shift count is greater than the single-word length.

Table B.—*End-off right and left shift sequences of operations*

|  |  | RIGHT |  | LEFT |  |
|---|---|---|---|---|---|
|  |  | A | AQ | A | AQ |
| $C\emptyset < a$ | 1. | A →Dø | AQ→DøD1 | A →Dø | AQ→Dø D1 |
|  | 2. | SK→Cø | SK→Cø | SK→Cø | SK→Cø |
|  | 3. | (EN.SIGN) | (EN.SIGN) | - | - |
|  | 4. | Dø→S | Dø→S | Dø→S | Dø→S |
|  | 5. | E →S | E →S | E →S | E →S |
|  | 6. | CLEAR A | CLEAR AQ | CLEAR A | CLEAR AQ |
|  | 7. | SU→A | SU→A | SL→A | SL→A |
|  | 8. |  | SL→Q |  |  |
|  |  | $\boxed{\begin{array}{l}E=\\C\emptyset\end{array}}$ | (DIS.SIGN) | $\boxed{\begin{array}{l}E=\\C\emptyset+(2^M-a-1)\\K=+a\end{array}}$ | - |
|  | 9. | K = 0 | D1→S |  | D1→S |
|  | 10. |  | SU→Q |  | SU→A |
|  |  |  |  |  | SL→Q |
| $C\emptyset > a$ | 1. | - | AQ→DøD1 | - | AQ→DøD1 |
|  | 2. | - | SK→Cø | - | SK→Cø |
|  | 3. | - | (EN.SIGN) | - | - |
|  | 4. | - | Dø→S | - | - |
|  | 5. | - | E →S | - | E →S |
|  | 6. | CLEAR A | CLEAR AQ | CLEAR A | CLEAR AQ |
|  | 7. | (SIGN→A) | SU→Q | - | - |
|  | 8. | $\boxed{\begin{array}{l}E=\\C\emptyset+(2^M-a)\\K = -a\end{array}}$ | - | $\boxed{\begin{array}{l}E=\\C\emptyset+(2^{M+L}-a-1)\\K = -2a\end{array}}$ | - |
|  | 9. |  | - |  | D1→S |
|  | 10. | - | (SIGN→A) | - | SL→A |

Table C.—*Circular right and left shift sequences of operations*

|  |  | RIGHT |  | LEFT |  |
|---|---|---|---|---|---|
|  |  | A | AQ | A | AQ |
| $C\emptyset < a$ | 1. | A→Dø | AQ→DøD1 | A→Dø | AQ→DøD1 |
|  | 2. | SK→Cø | SK→Cø | SK→Cø | SK→Cø |
|  | 3. | - | - | - | - |
|  | 4. | Dø→S | Dø→S | Dø→S | Dø→S |
|  | 5. | E→S | E→S | E→S | E→S |
|  | 6. | CLEAR A | CLEAR AQ | CLEAR A | CLEAR AQ |
|  | 7. | SU→A | SU→A | SU→A | SU→Q |
|  |  | SL→A | SL→Q | SL→A | SL→A |
|  | 8. | - | - | - | - |
|  | 9. | $\boxed{\begin{array}{l}E=\\C\emptyset\\K=0\end{array}}$ | D1→S | $\boxed{\begin{array}{l}E=\\C\emptyset+(2^M-a-1)\\K=+a\end{array}}$ | D1→S |
|  | 10. |  | SU→Q |  | SU→A |
|  |  |  | SL→A |  | CL→Q |
| $C\emptyset > a$ | 1. | A→Dø | AQ→DøD1 | A→Dø | AQ→DøD1 |
|  | 2. | SK→Cø | SK→Cø | SK→Cø | SK→Cø |
|  | 3. | - | - | - | - |
|  | 4. | Dø→S | Dø→S | Dø→S | Dø→S |
|  | 5. | E→S | E→S | E→S | E→S |
|  | 6. | CLEAR A | CLEAR AQ | CLEAR A | CLEAR AQ |
|  | 7. | SU→A | SU→Q | SU→A | SU→A |
|  |  | SL→A | SL→A | SL→A | SL→Q |
|  | 8. | - | - | - | - |
|  | 9. | $\boxed{\begin{array}{l}E=\\C\emptyset+(2^M-a)\\K = -a\end{array}}$ | D1→S | $\boxed{\begin{array}{l}E=\\C\emptyset+(2^M-a-1)\\K=-2a\end{array}}$ | D1→S |
|  | 10. |  | SL→A |  | SU→Q |
|  |  |  | SL→Q |  | SL→A |

Table D.—*Shift equation constants*

The shift equation constants are generated from the following equations:

$$S = B(C\emptyset + d) + K = E + K$$

$$B \begin{cases} = \text{I: Right Shift} \\ = \text{N: Left Shift} \end{cases}$$

$$d \begin{cases} = 0: C\emptyset < a \\ = 2^M - a: C\emptyset > a \end{cases} \text{Right Shift}$$

$$d \begin{cases} = 2^M - a - 1: C\emptyset < a \\ = 2^{M+1} - 2a - 1: C\emptyset > a \end{cases} \text{Left Shift}$$

$$K \begin{cases} = 0: C\emptyset < a \\ = +a: C\emptyset > a \end{cases} \text{Right Shift}$$

$$K \begin{cases} = -a: C\emptyset < a \\ = -2a: C\emptyset > a \end{cases} \text{Left Shift}$$

Table E.—*Shift equation constants*

| a | M | $2^M$ | Right Shift | | | | Left Shift | | | |
|---|---|---|---|---|---|---|---|---|---|---|
|  |  |  | $C\emptyset < a$ | | $C\emptyset > a$ | | $C\emptyset < a$ | | $C\emptyset > a$ | |
|  |  |  | d | K | d | K | d | K | d | K |
| 6 | 3 | 8 | 0 | 0 | 2 | +6 | 1 | −6 | 3 | −12 |
| 7 | 3 | 8 | 0 | 0 | 1 | +7 | 0 | −7 | 1 | −14 |
| 8 | 4 | 16 | 0 | 0 | 8 | +8 | 7 | −8 | 15 | −16 |
| 9 | 4 | 16 | 0 | 0 | −7 | +9 | 6 | −9 | 13 | −18 |
| 10 | 4 | 16 | 0 | 0 | 6 | +10 | 5 | −10 | 11 | −20 |
| 12 | 4 | 16 | 0 | 0 | 4 | +12 | 3 | −12 | 7 | −24 |
| 15 | 4 | 16 | 0 | 0 | 1 | +15 | 0 | −15 | 1 | −30 |
| 24 | 5 | 32 | 0 | 0 | 8 | +24 | 7 | −24 | 15 | −48 |
| 28 | 5 | 32 | 0 | 0 | 4 | +28 | 3 | −28 | 7 | −56 |
| 30 | 5 | 32 | 0 | 0 | 2 | +30 | 1 | −30 | 3 | −60 |
| 32 | 6 | 64 | 0 | 0 | 32 | +32 | 31 | −32 | 63 | −64 |
| 36 | 6 | 64 | 0 | 0 | 28 | +36 | 27 | −36 | 55 | −72 |
| 48 | 6 | 64 | 0 | 0 | 16 | +48 | 15 | −48 | 31 | −96 |
| 60 | 6 | 64 | 0 | 0 | 4 | +60 | 3 | −60 | 7 | −120 |

DESCRIPTION OF THE PREFERRED EMBODIMENT

The illustrated embodiment of FIG. 1 is a block diagram of an electronic data processing system in which the concept of the present invention may be incorporated. This system includes Control 10, Memory 12, Instruction Translator 14, Instruction Register 16 and the remaining portions thereof that may, for the purposes of the present discussion, be considered to be a part of the arithmetic section of a digital computer, or Central Processor. The basic environment for the most efficient utilization of the concept of the present invention is of a high speed, programmable device such as a stored program computer having a random access memory, or the like, that, through the use of coded instructions, directs the control of a high speed arithmetic section. Although the Central Processor utilized in the illustrated embodiment is a high-speed, random-access memory, stored-program computer, it is to be understood that any programmable device may be utilized.

The Central Processor of FIG. 1 emphasizes rapid communication with external devices and implies a large, random-access, internal memory and is of the stored program type. That is, once the program of instructions is written and coded in a form acceptable to the Central Processor, it is entered into the Memory, or storage, section of the Central Processor. From this point on the Central Processor, upon proper initiation, will execute the series of instructions that make up the stored program and thereby performs its intended function. Single address instruction words are applied at an average execution time of 20 microseconds ($\mu$s.). These instruction words are of the same number of bits in length (30 binary digits) as are other words that are utilized in the memory registers of the Central Processor. Each memory section register is selectably addressed either as a single 30-bit word or as 2 independent 15-bit words. The Central Processor uses the parallel binary mode in the performance of arithmetic and logical operations using a one's complement subtractive arithmetic system of modulus $2^{30}-1$. Such a Central Processor may be of the same type as more fully described in the C. W. Ehrman et al. Patent No. 3,243,781 and the R. L. Burkholder et al. Patent No. 3,251,040, both assigned to the Sperry Rand Corporation as is the present application. Accordingly, no detailed discussion of such Central Processor shall be provided herein.

The Central Processor control section, which may be considered to consist of Control 10, Instruction Translator 14 and Instruction Register 16, provides control for the rest of the data processing system. The control section interprets and directs the execution of the Central Processor instructions and auxiliary operations. Each Central Processor instruction, except input/output instructions, performs one or more basic operations such as, addition, subtraction, logical operation etc. Each instruction can also specify certain special auxiliary operations that may modify or extend the basic operation. Such operations are more fully described in the above referenced Ehrman et al. and Burkholder et al. patents.

Each instruction performed by the Central Processor is designated by a 30-bit instruction word, and is performed in two sequential steps; interpretation and execution. When the instruction word is interpreted, the instruction word is analyzed to activate logic circuits that will perform a specific function. When the instruction is executed the actual function is performed. The following listing describes the principle events that happen when an instruction word is interpreted and then executed:

(1) Interpretation is performed in four basic steps:

(a) Aquire the instruction word from memory.
(b) Determine the operand source.
(c) Determine the operation to be performed.
(d) Condition the logic circuits.

(2) Execution is performed in three basic steps:

(a) Obtain the operand from memory when required.
(b) Perform arithmetic or logic operation.
(c) Store the results in memory when required.

Different bits of the instruction word are combined to perform different functions, and have been assigned unique symbols for ease of reference. The symbols for the particular form of the instruction word that is to be utilized in the present discussion are as follows:

(1) The basic instruction word format is illustrated in FIG. 3 and is composed of five basic parts:

(a) $f$—Instruction Code Designator consisting of six bits—bits $2^{29}$–$2^{24}$, which, when decoded, specify the major operation to be performed.
(b) $j$—Branch Condition Designator consisting of three bits, bits $2^{23}$–$2^{21}$, which, when decoded, specify skip or jump conditions, register or repeat modifications.
(c) $k$—Operand Interpretation Designator consisting of three bits, bits $2^{20}$–$2^{18}$, which, when decoded, defines the source and form of the operand. The interpretation of $k$ is different for the read, store and replace categories of instructions.
(d) $b$—Index Designator consisting of three bits, bits $2^{17}$–$2^{15}$, which, when decoded, specifies the B register to be used in conjunction with the modification of the $y$ portion.
(e) $y$—Operand, or Operand Address Designator, which consists of 15 bits, bits $2^{14}$–$2^0$. Depending upon $k$, $y$ may represent an operand, or an operand address in memory.

The instruction code, $f$ designator, that appears in bit positions $2^{29}$–$2^{24}$ of an instruction word designates the function that is to be performed by that instruction. The basic function codes are categorized as follows:

(1) Transfer instructions either transfer data that is contained in a storage location to a register or store the contents of a register in a storage location.

(2) Arithmetic instructions combine the contents of a storage location with the contents of a selected register or combine the contents of two registers forming a sum, difference, quotient or product. The result that is formed is then stored in a storage location, retained in a register, or both.

(3) Shift instructions shift the contents of a selected register C$\emptyset$ bit positions right or left. The shift count designator, C$\emptyset$ when held in the C$\emptyset$ Register 28 and SK when held in the Instruction Register 16, is always treated as a six bit positive number regardless of the combination or the configuration of the other 24 bits, bits $2^{29}$–$2^6$, of the instruction word.

(4) Logical instructions are based upon five operations: logical product, selective set, selective clear, selective complement and selective substitute. They operate on the individual bit positions of the operand: that is, the condition of the specific bit position in the result is determined by the condition of the corresponding bit position in the operand.

(5) Modifying instructions cause a program to take one of three actions:

(a) Execute the following instruction the number of times specified.
(b) Skip the next instruction and continue in sequence.
(c) Jump to another portion of the program.

(6) Jump instructions are used to transfer program control to other sections of the program. When jump instructions are executed, the program register in the control section is cleared and the new program address is entered.

(7) Input/Output instruction are used to facilitate the transfer of data between the Central Processor and the various peripheral subsystems.

Read class instructions are those instructions, that, essentially, cause the transfer of the contents of some memory location.

Replace class instructions are those instructions that cause the union of the contents of a memory location and of the contents of a register leaving the result in a register and storing the results in a memory location.

The present invention is particularly directed toward the shifting operation of the Central Processor, and, accordingly, only the shift functions shall be considered in detail herein. Broadly speaking, a shifting function is occasioned when during the programmed operation of the Central Processor an instruction word having an instruction code $f$ of 01, 02, 03, 05, 06 or 07 (see Table H) is transferred to the Instruction Register 16. The $f$ designator, bits $2^{29}$–$2^{24}$, of the instruction word is transferred ($f \rightarrow IT$) to the Instruction Translator IT 14 where it is translated so as to implement and condition the required logical operations. The translated shift function designator $f$ from the Instruction Translator 14 enables the specified right shift enable RH line 20 or left shift enable LH line 22 at the Shift Enable Generator SEG 24 conditioning it for receipt of the modified shift count from the shift Count Modifier SCM 26. The translated shift function designator $f$ from the Instruction Translator 14 also initiates the transfer of low order 6 bits, bits $2^5$–$2^0$, of $y$ (SK→CØ) into the Shift Count Register CØ 28. The shift count (CØ) from the CØ Register 28 flows into the Shift Count Modifier 26 which generates, in parallel, four basic possible, or modified, shift count signals. Only one of these four modified shift count signals, each of which is in the form of a multi-bit word, is gated into the logical network of the Shift Enable Generator 24. The shift Enable Generator 24, in turn, couples the particular shift enable signals (1.0, 1.1, 1.2, or 1.3 to level 1; 2.0, 2.4, 2.8, or 2.12 to level 2; and, 3.0 or 3.16 to level 3) to the associated levels 1, 2 or 3 of Shifter SM 30 whereupon the word(s) held in the A and/or Q Register(s) are shifted through the Shifter 30 and back into the A and/or Q Register in its final shifted form.

Tables F and G illustrate the right and left shift translations to the Shifter 30 of the illustrated embodiment which utilizes a single-length operand of 30 bits. The column therein headed "Correction Factor" relates to the +0, ∓1, +2 and ∓3 Adder corrections and shall be explained in more detail in subsequent discussions with respect to FIG. 6. Table H explains the instruction repertoire that is utilized by the Central Processor of the illustrated embodiment illustrating the operating sequence that is associated with each instruction code. Table I explains the shift count CØ translations achieved by Shift Count Modifier 26 and Shift Enable Generator 24 providing the appropriate shift enables for the three levels of Shifter 30. As stated above the Shifter of the illustrated embodiment cannot shift left, but must always shift right. Thus, to accomplish a left shift Shift Count Modifier 26 must modify the shift count that is held in CØ register 16 so as to generate the proper multi-bit Shift Count Modifier 26 to Shift Enable Generator 26 (SCM→SEG) signals (see Table G) to effectuate a left shift; e.g., the Shift Count Modifier 26 modifies a three bit left shift count whereby the Shifter 30 is programmed to actually accomplish a twenty-seven bit right shift.

*Table F.—Right shift translations to shifter*

| Decimal Shift Count | CØ | Correction Factor | SCM→SEG | Shift Enables |
|---|---|---|---|---|
| 0 | 000000 | — | 00000 | 1.0, 2.0, 3.0 |
| 1 | 000001 | — | 00001 | 1.1, 2.0, 3.0 |
| 2 | 000010 | — | 00010 | 1.2, 2.0, 3.0 |
| 3 | 000011 | — | 00011 | 1.3, 2.0, 3.0 |
| 4 | 000100 | — | 00100 | 1.0, 2.4, 3.0 |
| 5 | 000101 | — | 00101 | 1.1, 2.4, 3.0 |
| 6 | 000110 | — | 00110 | 1.2, 2.4, 3.0 |
| 7 | 000111 | — | 00111 | 1.3, 2.4, 3.0 |
| 8 | 001000 | — | 01000 | 1.0, 2.8, 3.0 |
| 9 | 001001 | — | 01001 | 1.1, 2.8, 3.0 |
| 10 | 001010 | — | 01010 | 1.2, 2.8, 3.0 |
| 11 | 001011 | — | 01011 | 1.3, 2.8, 3.0 |
| 12 | 001100 | — | 01100 | 1.0, 2.12, 3.0 |
| 13 | 001101 | — | 01101 | 1.1, 2.12, 3.0 |
| 14 | 001110 | — | 01110 | 1.2, 2.12, 3.0 |
| 15 | 001111 | — | 01111 | 1.3, 2.12, 3.0 |
| 16 | 010000 | — | 10000 | 1.0, 2.0, 3.16 |
| 17 | 010001 | — | 10001 | 1.1, 2.0, 3.16 |
| 18 | 010010 | — | 10010 | 1.2, 2.0, 3.16 |
| 19 | 010011 | — | 10011 | 1.3, 2.0, 3.16 |
| 20 | 010100 | — | 10100 | 1.0, 2.4, 3.16 |
| 21 | 010101 | — | 10101 | 1.1, 2.4, 3.16 |
| 22 | 010110 | — | 10110 | 1.2, 2.4, 3.16 |
| 23 | 010111 | — | 10111 | 1.3, 2.4, 3.16 |
| 24 | 011000 | — | 11000 | 1.0, 2.8, 3.16 |
| 25 | 011001 | — | 11001 | 1.1, 2.8, 3.16 |
| 26 | 011010 | — | 11010 | 1.2, 2.8, 3.16 |
| 27 | 011011 | — | 11011 | 1.3, 2.8, 3.16 |
| 28 | 011100 | — | 11100 | 1.0, 2.12, 3.16 |
| 29 | 011101 | — | 11101 | 1.1, 2.12, 3.16 |

SCM→SEG is only lower 5 bits.

| Decimal Shift Count | CØ | Correction Factor | SCM→SEG | Shift Enables |
|---|---|---|---|---|
| 30 | 011110 | +2 | 00000 | 1.0, 2.0, 3.0 |
| 31 | 011111 | +2 | 00001 | 1.1, 2.0, 3.0 |
| 32 | 100000 | +2 | 00010 | 1.2, 2.0, 3.0 |
| 33 | 100001 | +2 | 00011 | 1.3, 2.0, 3.0 |
| 34 | 100010 | +2 | 00100 | 1.0, 2.4, 3.0 |
| 35 | 100011 | +2 | 00101 | 1.1, 2.4, 3.0 |
| 36 | 100100 | +2 | 00110 | 1.2, 2.4, 3.0 |
| 37 | 100101 | +2 | 00111 | 1.3, 2.4, 3.0 |
| 38 | 100110 | +2 | 01000 | 1.0, 2.8, 3.0 |
| 39 | 100111 | +2 | 01001 | 1.1, 2.8, 3.0 |
| 40 | 101000 | +2 | 01010 | 1.2, 2.8, 3.0 |
| 41 | 101001 | +2 | 01011 | 1.3, 2.8, 3.0 |
| 42 | 101010 | +2 | 01100 | 1.0, 2.12, 3.0 |
| 43 | 101011 | +2 | 01101 | 1.1, 2.12, 3.0 |
| 44 | 101100 | +2 | 01110 | 1.2, 2.12, 3.0 |
| 45 | 101101 | +2 | 01111 | 1.3, 2.12, 3.0 |
| 46 | 101110 | +2 | 10000 | 1.0, 2.0, 3.16 |
| 47 | 101111 | +2 | 10001 | 1.1, 2.0, 3.16 |
| 48 | 110000 | +2 | 10010 | 1.2, 2.0, 3.16 |
| 49 | 110001 | +2 | 10011 | 1.3, 2.0, 3.16 |
| 50 | 110010 | +2 | 10100 | 1.0, 2.4, 3.16 |
| 51 | 110011 | +2 | 10101 | 1.1, 2.4, 3.16 |
| 52 | 110100 | +2 | 10110 | 1.2, 2.4, 3.16 |
| 53 | 110101 | +2 | 10111 | 1.3, 2.4, 3.16 |
| 54 | 110110 | +2 | 11000 | 1.0, 2.8, 3.16 |
| 55 | 110111 | +2 | 11001 | 1.1, 2.8, 3.16 |
| 56 | 111000 | +2 | 11010 | 1.2, 2.8, 3.16 |
| 57 | 111001 | +2 | 11011 | 1.3, 2.8, 3.16 |
| 58 | 111010 | +2 | 11100 | 1.0, 2.12, 3.16 |
| 59 | 111011 | +2 | 11101 | 1.1, 2.12, 3.16 |
| 60 | 111100 | | | |
| 61 | 111101 | | CØ≧60, Sign Fill Registers AQ | |
| 62 | 111110 | | | |
| 63 | 111111 | | | |

*Table G.—Left shift translations to shifter*

| Decimal Left Shift Count | CØ Reg. | Correction factor | SCM→SEG (Complement) | Equivalent Right Shift | Shift enables |
|---|---|---|---|---|---|
| 0 | 000000 | — | 00000 | 0 | 1.0, 2.0, 3.0 |
| 1 | 000001 | +1 | 11101 | 59 | 1.1, 2.12, 3.16 |
| 2 | 000010 | +1 | 11100 | 58 | 1.0, 2.12, 3.16 |
| 3 | 000011 | +1 | 11011 | 57 | 1.3, 2.8, 3.16 |
| 4 | 000100 | +1 | 11010 | 56 | 1.2, 2.8, 3.16 |
| 5 | 000101 | +1 | 11001 | 55 | 1.1, 2.8, 3.16 |
| 6 | 000110 | +1 | 11000 | 54 | 1.0, 2.8, 3.16 |
| 7 | 000111 | +1 | 10111 | 53 | 1.3, 2.4, 3.16 |
| 8 | 001000 | +1 | 10110 | 52 | 1.2, 2.4, 3.16 |
| 9 | 001001 | +1 | 10101 | 51 | 1.1, 2.4, 3.16 |
| 10 | 001010 | +1 | 10100 | 50 | 1.0, 2.4, 3.16 |
| 11 | 001011 | +1 | 10011 | 49 | 1.3, 2.0, 3.16 |
| 12 | 001100 | +1 | 10010 | 48 | 1.2, 2.0, 3.16 |
| 13 | 001101 | +1 | 10001 | 47 | 1.1, 2.0, 3.16 |
| 14 | 001110 | +1 | 10000 | 46 | 1.0, 2.0, 3.16 |
| 15 | 001111 | +1 | 01111 | 45 | 1.3, 2.12, 3.0 |
| 16 | 010000 | +1 | 01110 | 44 | 1.2, 2.12, 3.0 |
| 17 | 010001 | +1 | 01101 | 43 | 1.1, 2.12, 3.0 |
| 18 | 010010 | +1 | 01100 | 42 | 1.0, 2.12, 3.0 |
| 19 | 010011 | +1 | 01011 | 41 | 1.3, 2.8, 3.0 |
| 20 | 010100 | +1 | 01010 | 40 | 1.2, 2.8, 3.0 |
| 21 | 010101 | +1 | 01001 | 39 | 1.1, 2.8, 3.0 |
| 22 | 010110 | +1 | 01000 | 38 | 1.0, 2.8, 3.0 |
| 23 | 010111 | +1 | 00111 | 37 | 1.3, 2.4, 3.0 |
| 24 | 011000 | +1 | 00110 | 36 | 1.2, 2.4, 3.0 |
| 25 | 011001 | +1 | 00101 | 35 | 1.1, 2.4, 3.0 |
| 26 | 011010 | +1 | 00100 | 34 | 1.0, 2.4, 3.0 |
| 27 | 011011 | +1 | 00011 | 33 | 1.3, 2.0, 3.0 |
| 28 | 011100 | +1 | 00010 | 32 | 1.2, 2.0, 3.0 |
| 29 | 011101 | +1 | 00001 | 31 | 1.1, 2.0, 3.0 |

SCM→SEG is only lower 5 bits.

| Decimal Left Shift Count | CØ Reg. | Correction factor | SCM→SEG (Complement) | Equivalent Right Shift | Shift enables |
|---|---|---|---|---|---|
| 30 | 011110 | +1 | 00000 | 30 | 1.0, 2.0, 3.0 |
| 31 | 011111 | +3 | 11101 | 29 | 1.1, 2.12, 3.16 |
| 32 | 100000 | +3 | 11100 | 28 | 1.0, 2.12, 3.16 |
| 33 | 100001 | +3 | 11011 | 27 | 1.3, 2.8, 3.16 |
| 34 | 100010 | +3 | 11010 | 26 | 1.2, 2.8, 3.16 |
| 35 | 100011 | +3 | 11001 | 25 | 1.1, 2.8, 3.16 |
| 36 | 100100 | +3 | 11000 | 24 | 1.0, 2.8, 3.16 |

Table G.—Continued

| Decimal Left Shift Count | CØ Reg. | Correction factor | SCM→SEG (Complement) | Equivalent Right Shift | Shift enables |
|---|---|---|---|---|---|
| 37 | 100101 | +3 | 10111 | 23 | 1.3, 2.4, 3.16 |
| 38 | 100110 | +3 | 10110 | 22 | 1.2, 2.4, 3.16 |
| 39 | 100111 | +3 | 10101 | 21 | 1.1, 2.4, 3.16 |
| 40 | 101000 | +3 | 10100 | 20 | 1.0, 2.4, 3.16 |
| 41 | 101001 | +3 | 10011 | 19 | 1.3, 2.0, 3.16 |
| 42 | 101010 | +3 | 10010 | 18 | 1.2, 2.0, 3.16 |
| 43 | 101011 | +3 | 10001 | 17 | 1.1, 2.0, 3.16 |
| 44 | 101100 | +3 | 10000 | 16 | 1.0, 2.0, 3.16 |
| 45 | 101101 | +3 | 01111 | 15 | 1.3, 2.12, 3.0 |
| 46 | 101110 | +3 | 01110 | 14 | 1.2, 2.12, 3.0 |
| 47 | 101111 | +3 | 01101 | 13 | 1.1, 2.12, 3.0 |
| 48 | 110000 | +3 | 01100 | 12 | 1.0, 2.12, 3.0 |
| 49 | 110001 | +3 | 01011 | 11 | 1.3, 2.8, 3.0 |
| 50 | 110010 | +3 | 01010 | 10 | 1.2, 2.8, 3.0 |
| 51 | 110011 | +3 | 01001 | 9 | 1.1, 2.8, 3.0 |
| 52 | 110100 | +3 | 01000 | 8 | 1.0, 2.8, 3.0 |
| 53 | 110101 | +3 | 00111 | 7 | 1.3, 2.4, 3.0 |
| 54 | 110110 | +3 | 00110 | 6 | 1.2, 2.4, 3.0 |
| 55 | 110111 | +3 | 00101 | 5 | 1.1, 2.4, 3.0 |
| 56 | 111000 | +3 | 00100 | 4 | 1.0, 2.4, 3.0 |
| 57 | 111001 | +3 | 00011 | 3 | 1.3, 2.0, 3.0 |
| 58 | 111010 | +3 | 00010 | 2 | 1.2, 2.0, 3.0 |
| 59 | 111011 | +3 | 00001 | 1 | 1.1, 2.0, 3.0 |
| 60 | 111100 | +3 | 00000 | 0 | 1.0, 2.0, 3.0 |
| 61 | 111101 | | | | Double register shifts with CØ>60, will result in A, Q being cleared |
| 62 | 111110 | | | | |
| 63 | 111111 | | | | |

Table H.—Instruction repertoire

| Instruction Code and Operation | Operation Sequence |
|---|---|
| 01 Right Shift Q | |
| This instruction shifts the contents of register Q CØ bit positions to the right. The bits that are shifted off the right end are lost and sign bits fill in on the left end in those bit positions that were vacated. If CØ>29, all bit positions of the Q register will contain the original sign bit. | Q→DØ, Enable Shifter Sign Ext. <br> DØ→SM, Clear Q <br> SU→Q if CØ<30 <br> DØ$_{29}$→Q if CØ≥30 |
| 02 Right Shift A | |
| This instruction shifts the contents of the A register CØ bit positions to the right. The bits that are shifted off the right end are lost and sign bits fill in on the left end in those bit positions that that were vacated. If CØ>29, all bit positions of the A register will contain the original sign bit. | A→DØ, Enable Shifter Sign Ext. <br> DØ→SM, Clear A <br> SU→A if CØ<30 <br> DØ$_{29}$→A if CØ≥30 |
| 03 Right Shift AQ | |
| This instruction shifts the contents of the AQ register, CØ bit positions to the right. The bits that are shifted off the right end of the Q register are lost, bits that are shifted off the right end of the A register fill in on the left end of the Q register in those positions that were vacated, and the left end of the the A register is filled in with sign bits. (The sign bit in this case is bit 29 of A register.) If CØ>29, all bit positions of the A register will contain a sign bit. If CØ>59, all bit positions of both the A and Q registers will contain a sign bit. | A→DØ, Q→D1, Enable Shifter Sign Ext. <br> Clear A. Clear Q <br> $t_1$ { DØ→SM <br> {SU→A} if CØ<30 <br> {SL→Q} <br> {DØ$_{29}$→A} if CØ≥30 <br> {SU→Q} if 60>CØ≥30 <br> $t_2$ { D1→SM, Disable Shifter Sign Ext. <br> {SU→Q} if CØ<30 <br> {DØ$_{29}$→Q} if CØ≥60 |
| 05 Left Shift Q | |
| This instruction shifts the contents of the Q register, CØ bit positions to the left. The bits that are shifted off the left end fill in on the right end in the bit positions that were vacated. CØ>59 should not be used with this instruction. If CØ=30 the Q register will be restored to its initial condition. | Q→DØ <br> DØ→SM, Clear Q <br> SU→Q <br> SL→Q |
| 06 Left Shift A | |
| This instruction shifts the contents of the A register CØ bit positions to the left. The bits that are shifted off the left end fill in on the right end in the bit positions that were vacated. CØ>59 should not be used with this instruction. If CØ=30, the A register will be restored to its initial condition. | A→DØ <br> DØ→SM, Clear A <br> SU→A <br> SL→A |

| Instruction Code and Operation | Operation Sequence |
|---|---|
| 07 Left Shift AQ | |
| This instruction shifts the contents of the AQ register CØ bit positions to the left. The bits that are shifted off the left end of the A register fill in on the right end of the Q register in the bit positions that were vacated, and the bits that are shifted off the left end of register Q fill in similarly on the right end of the A register. If CØ>59 AQ will be cleared. If CØ=30 the contents of the A register and the Q register will be interchanged. | A→DØ, Q→D1 <br> Clear A, Clear Q <br> $t_1$ { DØ→SM <br> {SU→A} if CØ>30 <br> {SL→Q} <br> {SL→A} if CØ≤30 <br> {SU→Q} <br> $t_2$ { D1→SM <br> {SU→Q} if CØ>30 <br> {SL→A} <br> {SU→A} if CØ≤30 <br> {SL→Q} |

Table I.—Shift count translation to shift enables

CØ=2⁵ 2⁴ 2³ 2² 2¹ 2⁰ Shift Count

| Modified | Shifter Level |
|---|---|
| 2¹ 2⁰ | 1 |
| 2³ 2² | 2 |
| 2⁴ | 3 |

| Shift Enable To Shifter Level |
|---|
| 0 0 = 1.0 <br> 0 1 = 1.1 <br> 1 0 = 1.2 <br> 1 1 = 1.3 } Level 1 |
| 0 0 = 2.0 <br> 0 1 = 2.4 <br> 1 0 = 2.8 <br> 1 1 = 2.12 } Level 2 |
| 0 = 3.0 <br> 1 = 3.16 } Level 3 |

FIGS. 4a through 4e illustrate the logic circuit types that are to be utilized in the description of the illustrated embodiment of the present invention and their associated truth tables. These circuits are well known, are commercially available, and, accordingly, shall not be described in detail since this would not add to an understanding of the present invention. It is, of course, understood that other types of logic configurations could be utilized in implementing the present invention; those shown herein have been found to be advantageous both with regard to cost and operation. In the description of the operation of the illustrated embodiment certain logic conventions shall be assumed. In this regard a closed arrow shall be equivalent to a ground signal which shall be equivalent to a logical "0" and representative of a positive signal while no arrow shall be considered to be equivalent to a —3 volt signal which shall be equivalent to a logical "1" and representative of a negative signal.

To better understand the nature of the shifting function as implemented by the preferred embodiment of the present invention it may be best to briefly discuss the Instruction Repertoire of Table H as it relates to the elements of FIG. 1. Initially it is assumed that the operand is always held in the A and/or Q Register(s) ready to be operated upon by the shift function as specified by the particular instruction code designator f held in the Instruction Register 16. Using Instruction Code 02 Right Shift A, as an example, the operation sequence is as follows. Initially, the contents of the A Register 40 are transferred into the DØ Register 42, through the Selector 44 and then into the Shifter 30 where it is shifted through levels 1, 2 and 3 in accordance with the particular shift enable signals coupled thereto. If CØ is less than 30 (CØ<30) the contents of Shifter Upper SU are transferred into A Register 40 where it is held. However, if CØ is equal to or greater than 30 (CØ≥30) the sign bit of the operand, i.e., DØ$_{29}$ is utilized to sign fill the A Register 40. The gating function performed by the Shifter Control to AQ(SAQ) 46 under the control of the shift count magnitude determination, such as the previously discussed CØ<30 or CØ≥30, is a well known gating function and as it plays no part in the novelty of the present invention no detailed discussion shall be given thereof.

Using Instruction Code 03 Right Shift AQ as a further example it can be seen from Table H that the operation sequence is initially that of transferring the contents of A Register 40 to DØ Register 42 and the contents of Q Register 50 to D1 register 52. In the previous example of Instruction Code 02 Right Shift A the shifting was a single length operation, i.e., a 30-bit operand held in 30-bit A Register 40 was shifted back into the 30-bit A Register 40, the operation could be performed in a single time sequence. However, due to the 30-bit single operand length of level 1 of Shifter 30 one 30-bit operand can be accommodated during one time sequence. Accordingly, a double length shift of Instruction Code 03 and 07 require two operation sequences whereby the contents of the A Register 40 and of the Q Register 50 are separately shifted through the Shifter 30 in two consecutive time sequences $t_1$ and $t_2$. During time sequence $t_1$ the contents of DØ Register 42 are transferred into the Shifter 30 wehreby;

if $CØ<30$ the contents of the upper portion of Level 3 of Shifter 30 SM, Shifter Upper SU, are transferred into A Register 40 and the contents of the lower portion of Level 3, Shifter Lower SL are transferred into the Q Register 50 if $CØ \geqslant 30$ the contents of bit $2^{29}$ of DØ Register 42, i.e. $DØ_{29}$, sign-fill A Register 40.

if $60 > CØ \geqslant 30$ the contents of the upper portion of level 3, Shifter Upper SU, are transferred to a Q Register 50.

Next, during time sequence $t_2$ the contents of D1 Register 52 are coupled to Shifter 30 whereby:

if $CØ<30$ the contents of the upper portion of Level 3, or Shifter Upper, are transferred to Q Register 50 if $CØ \geqslant 60$ the content of bit $2^{29}$ of D1 Register 52, i.e., $D1_{29}$, sign-fills Q Register 50.

It can be seen by an inspection of Table H that the Instruction Code and the related Operation Sequence are quite straightforward using gating means such as Shifter Control 46 that are well known in the art, it being understood that many conventional gating arrangements may be utilized.

Figures 5, 5A:
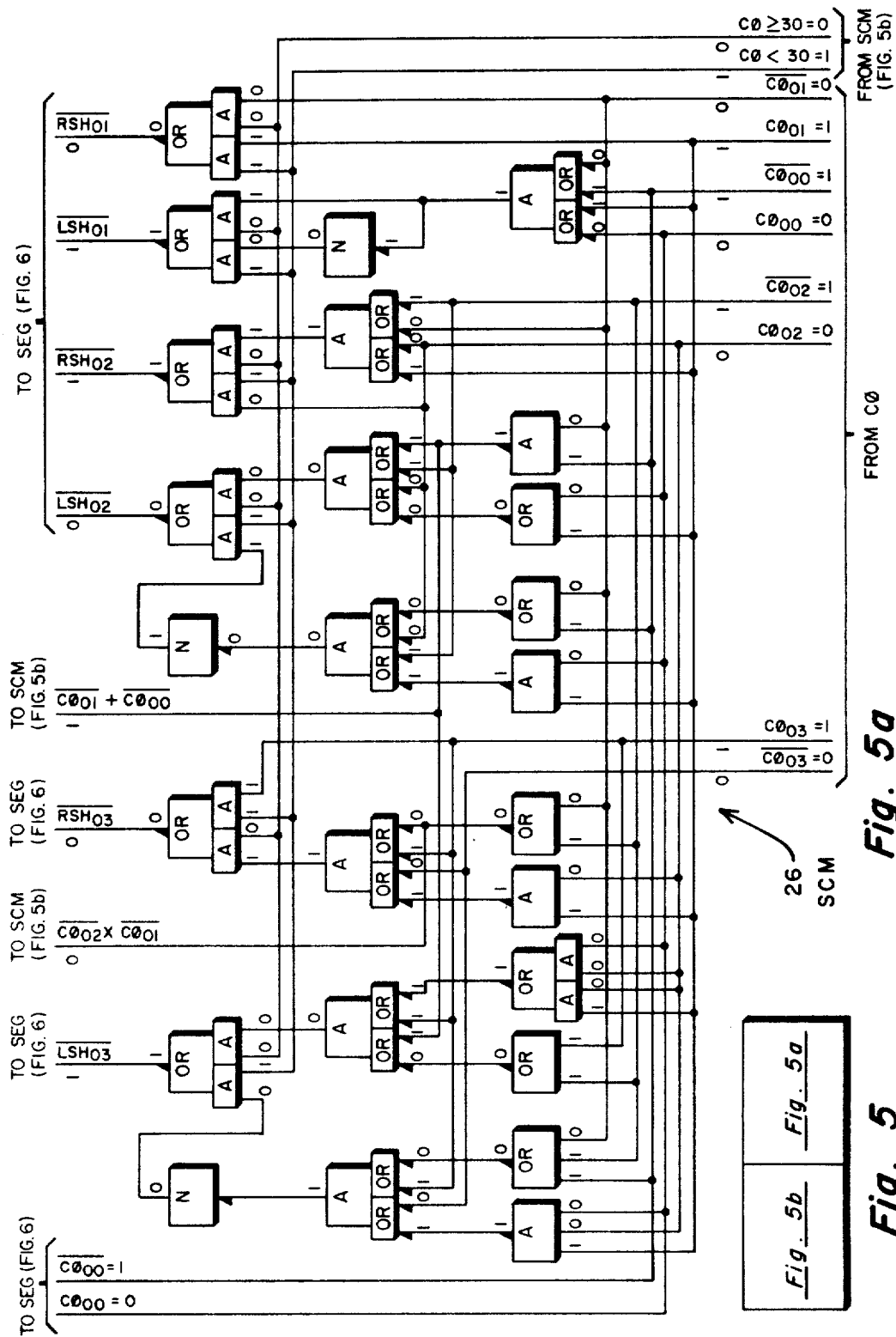
FIG. 5 is a block diagram of the arrangement of FIGS. 5a and 5b.
FIGS. 5a and 5b are block diagrams of the Shift Count Modifier.
Figure 5B:
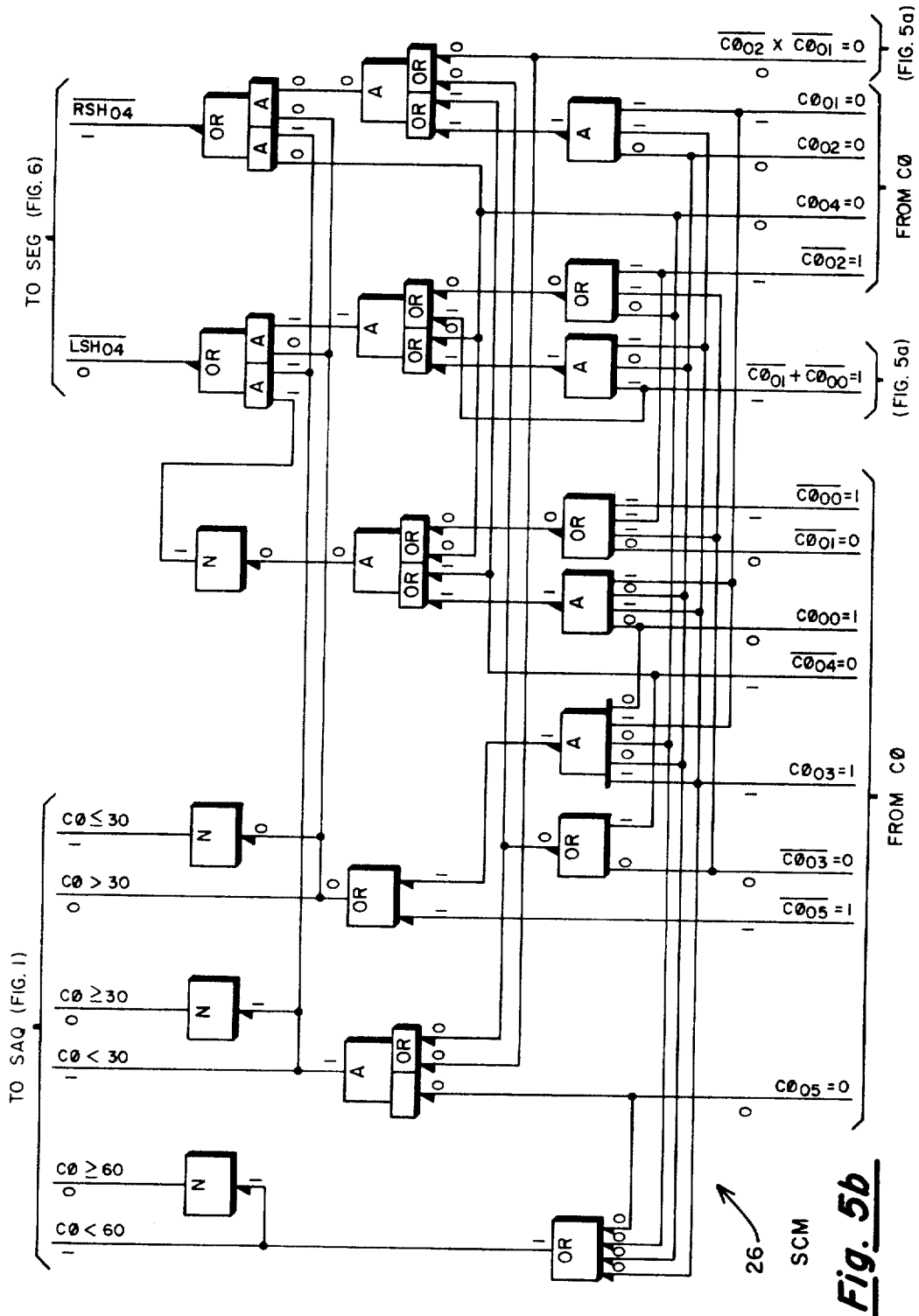
Figure 6:
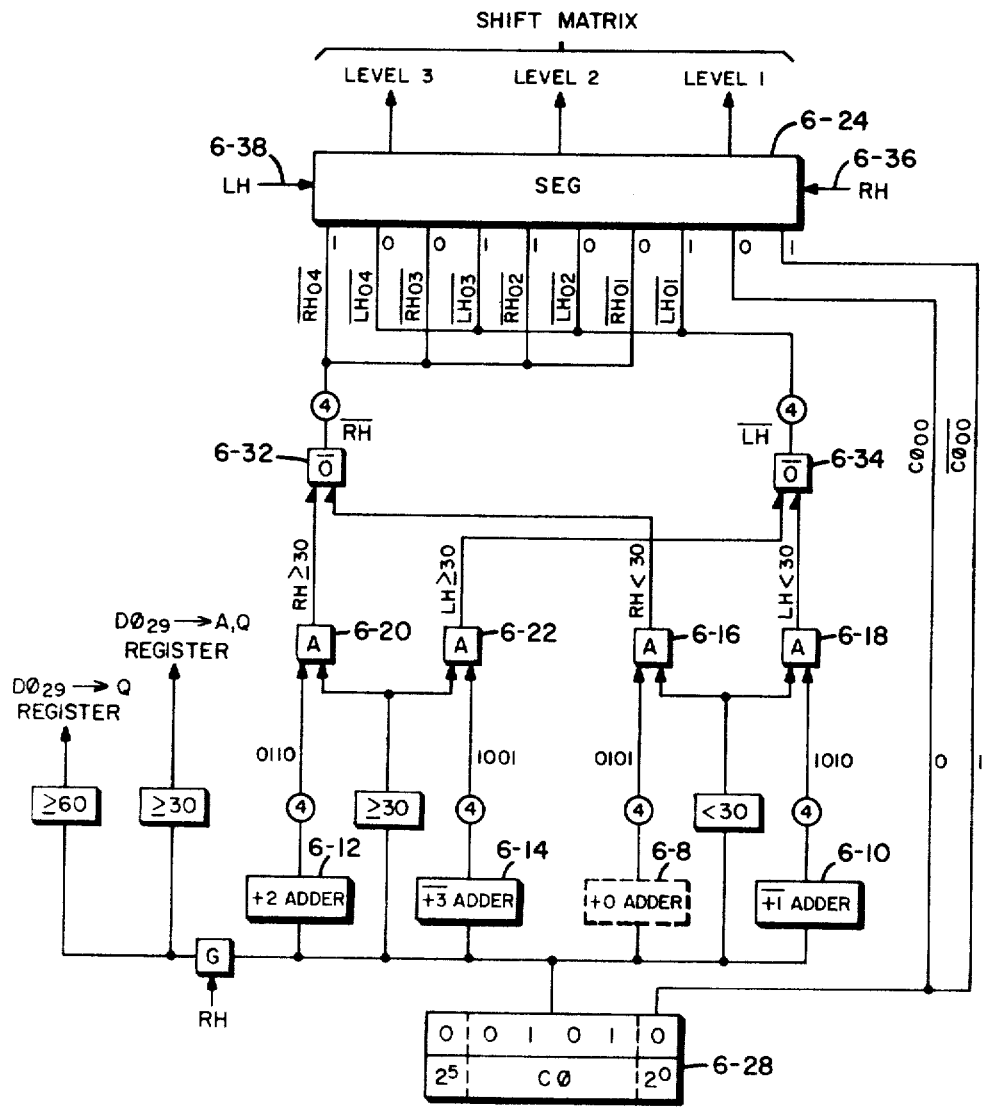
FIG. 6 is a symbolic block diagram of the Shift Count Modifier.
Figure 8A:
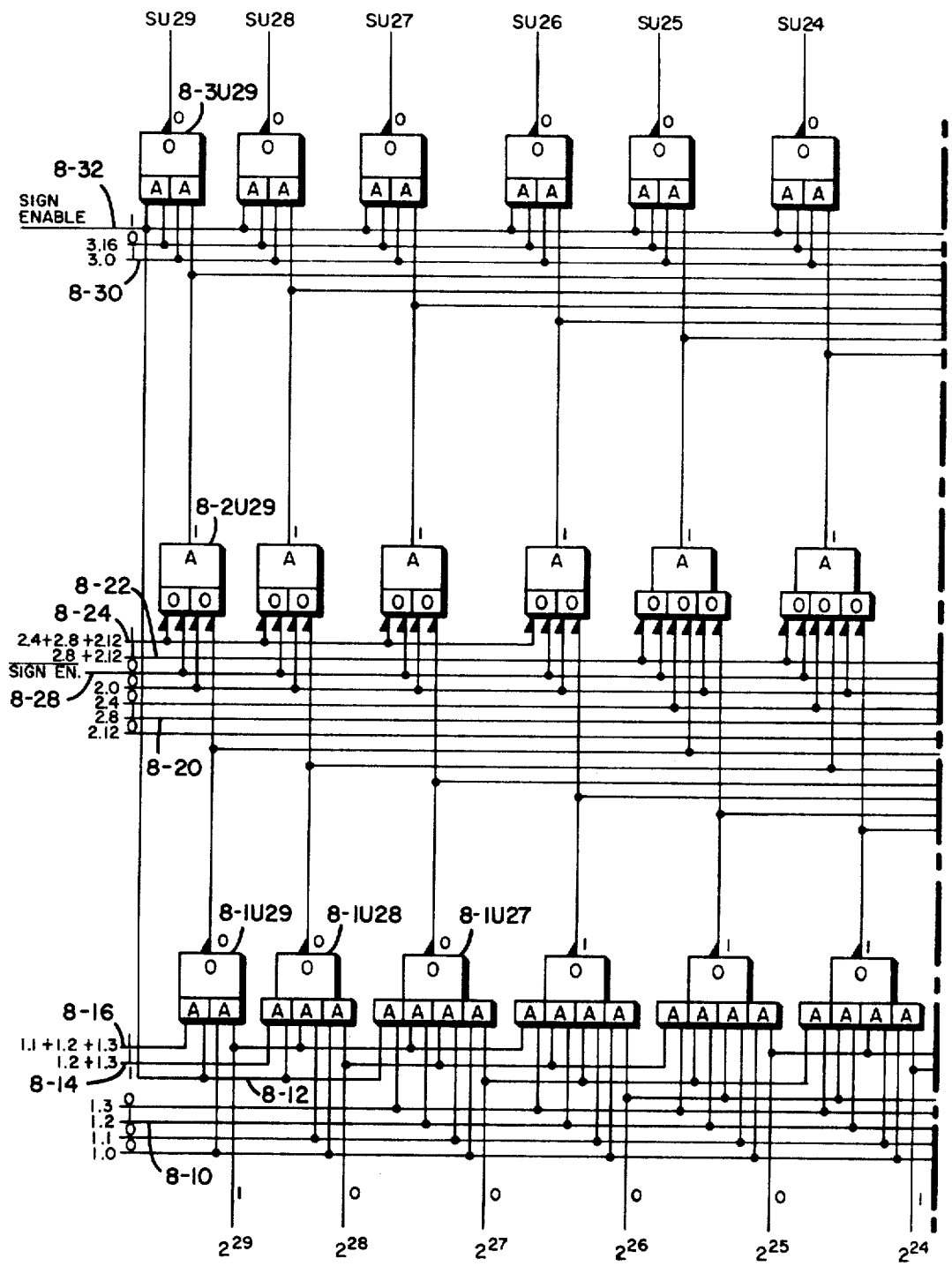
FIGS. 8a–8i are block diagrams of the Shifter.
Figure 8B:
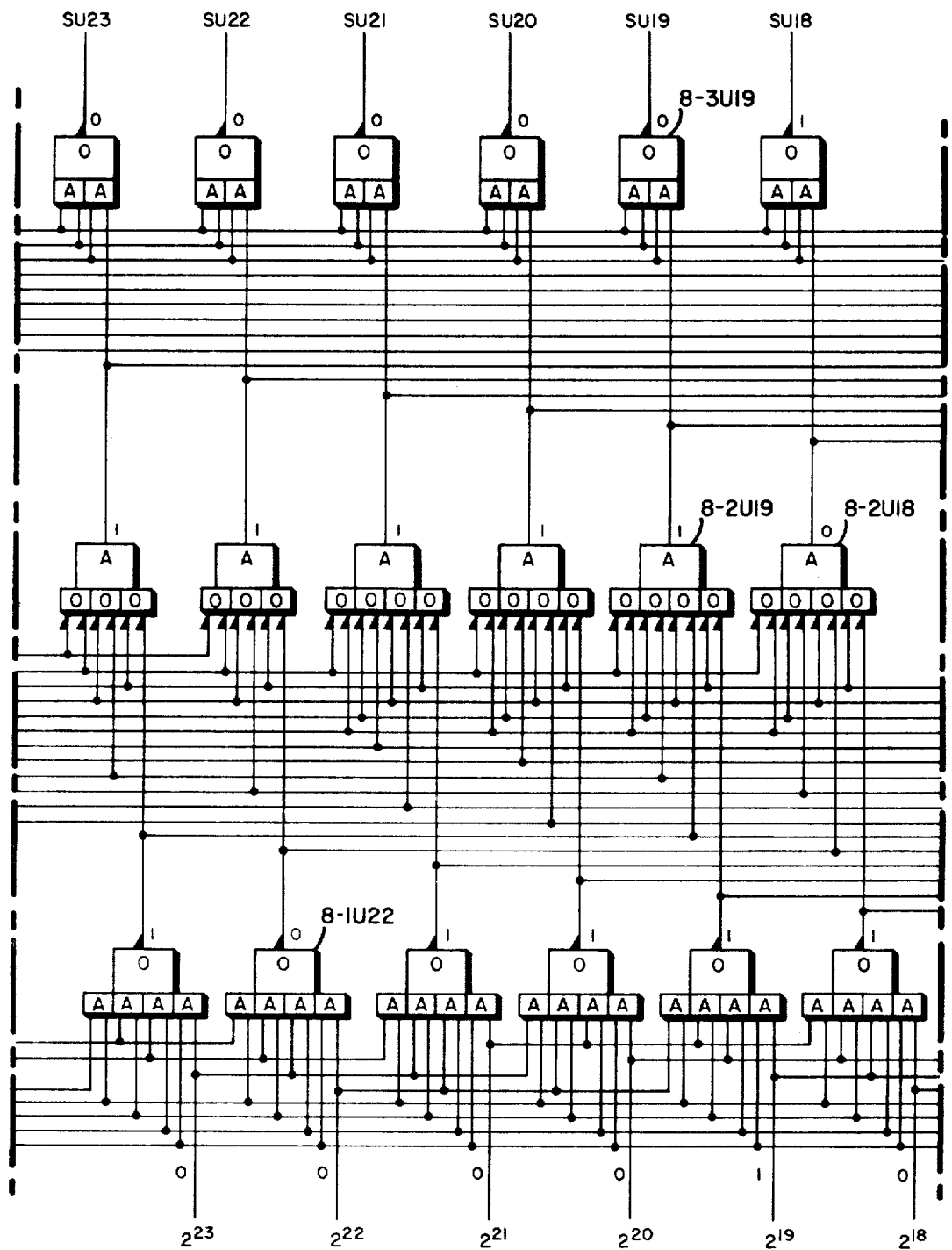
Figure 8C:
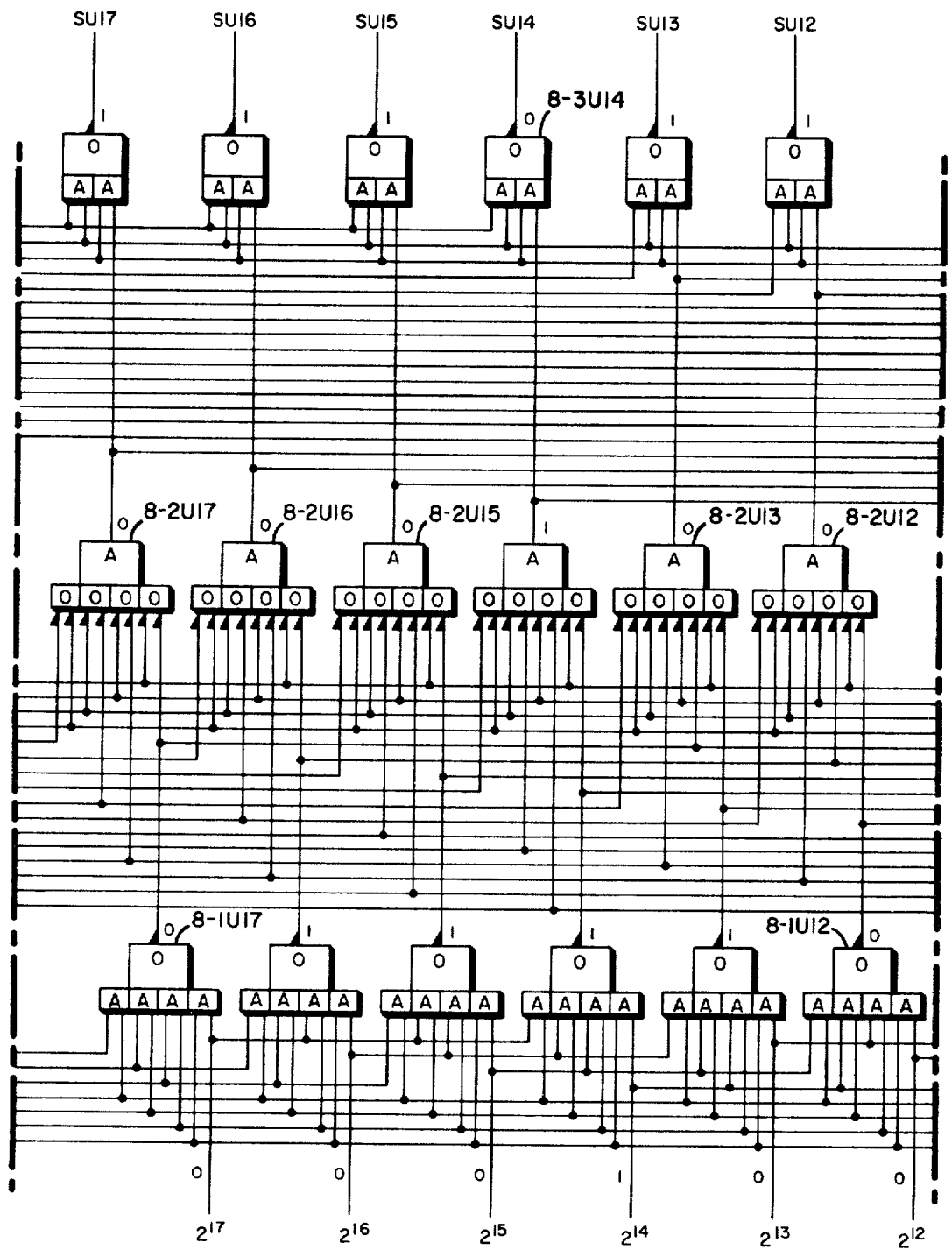
Figure 8D:
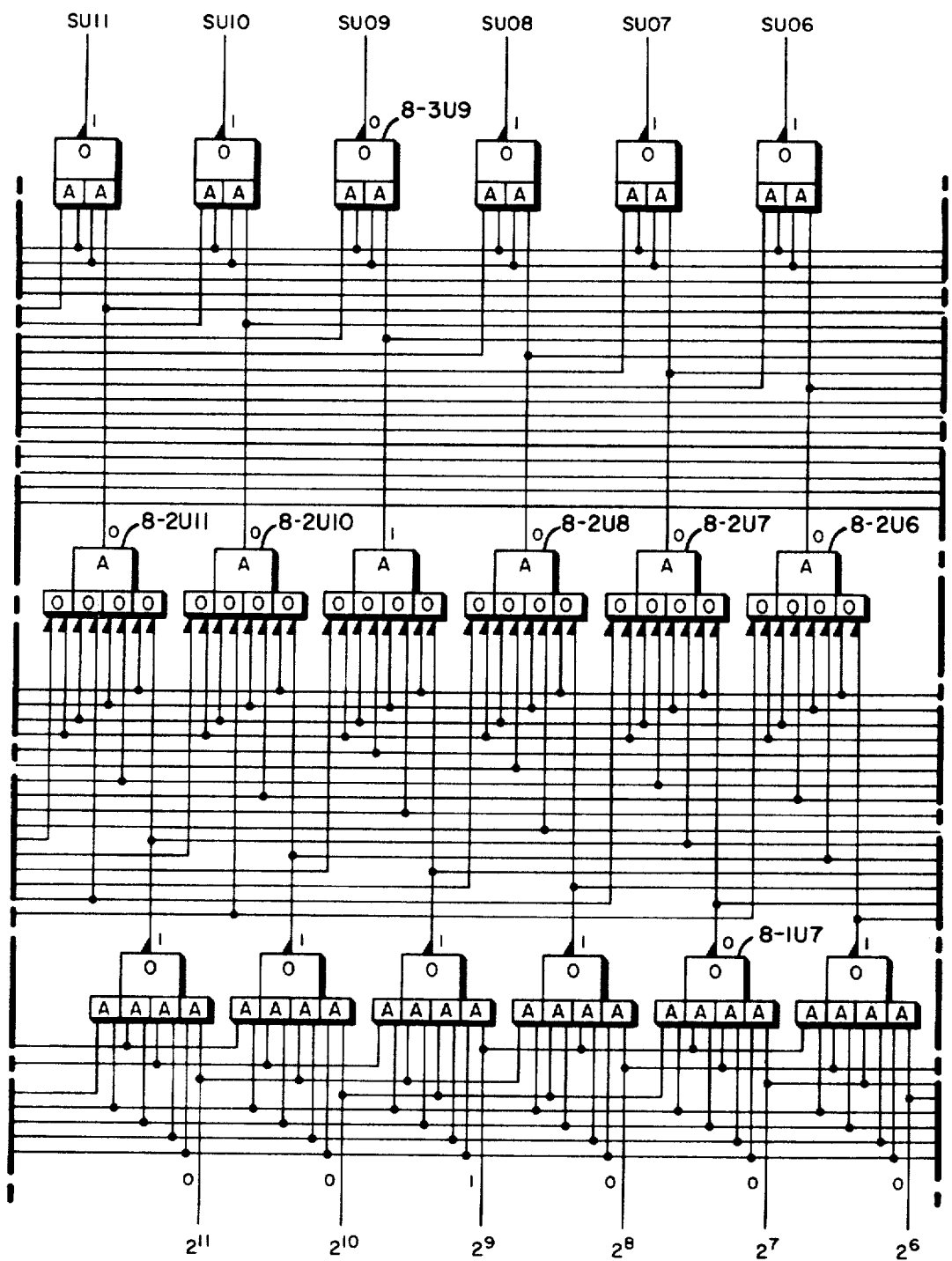
Figure 8E:
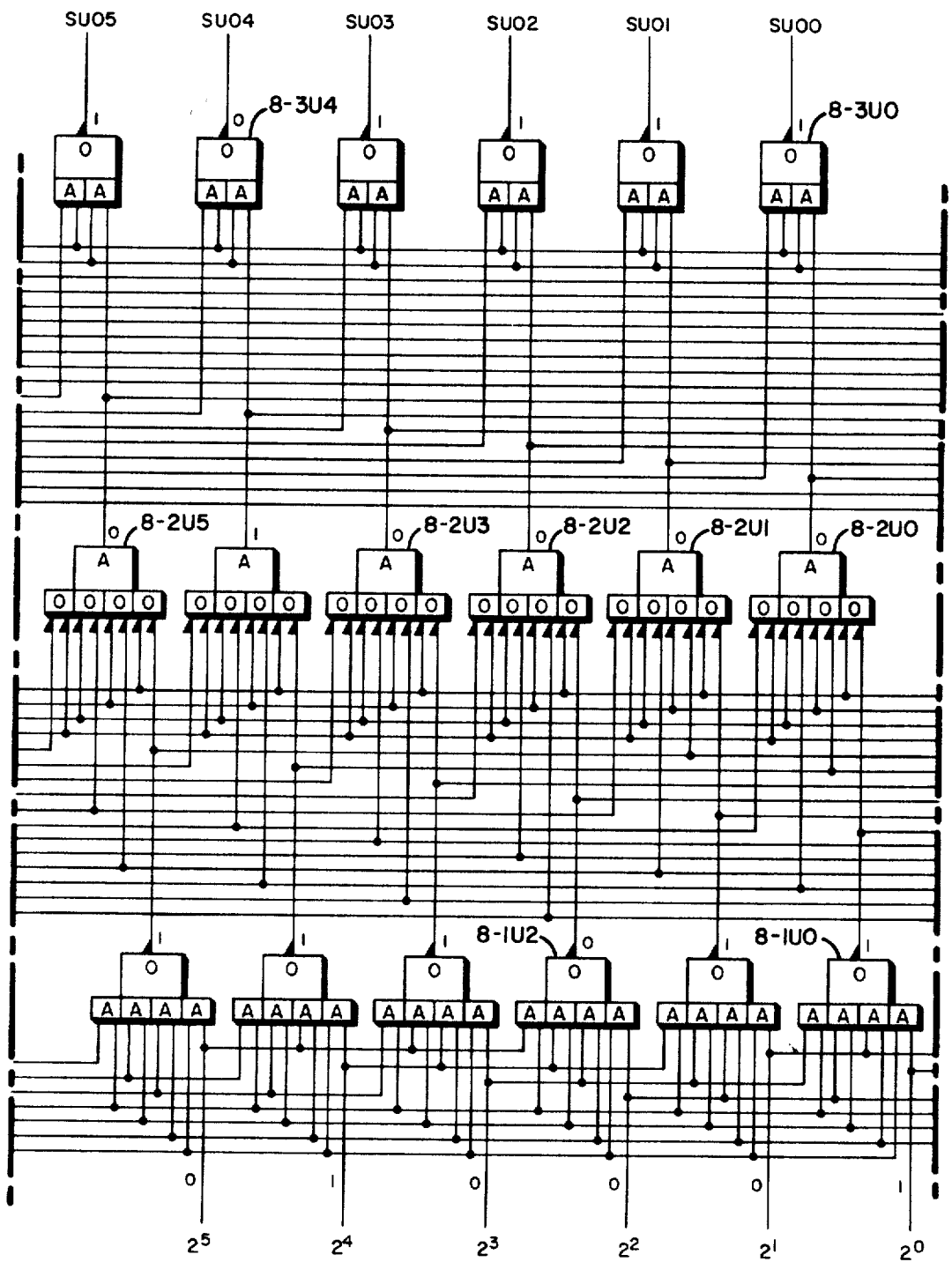
Figure 8F:
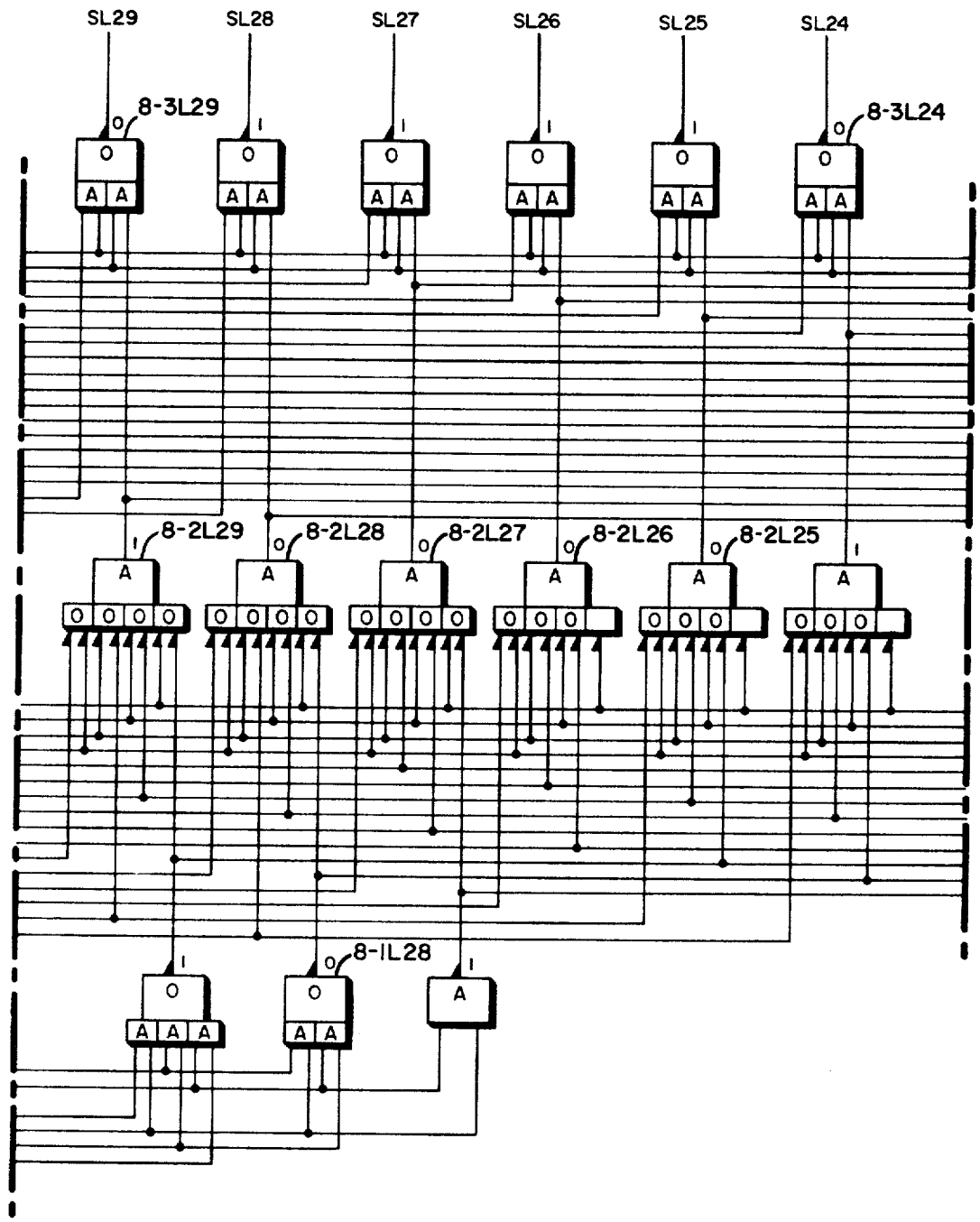
Figure 8G:
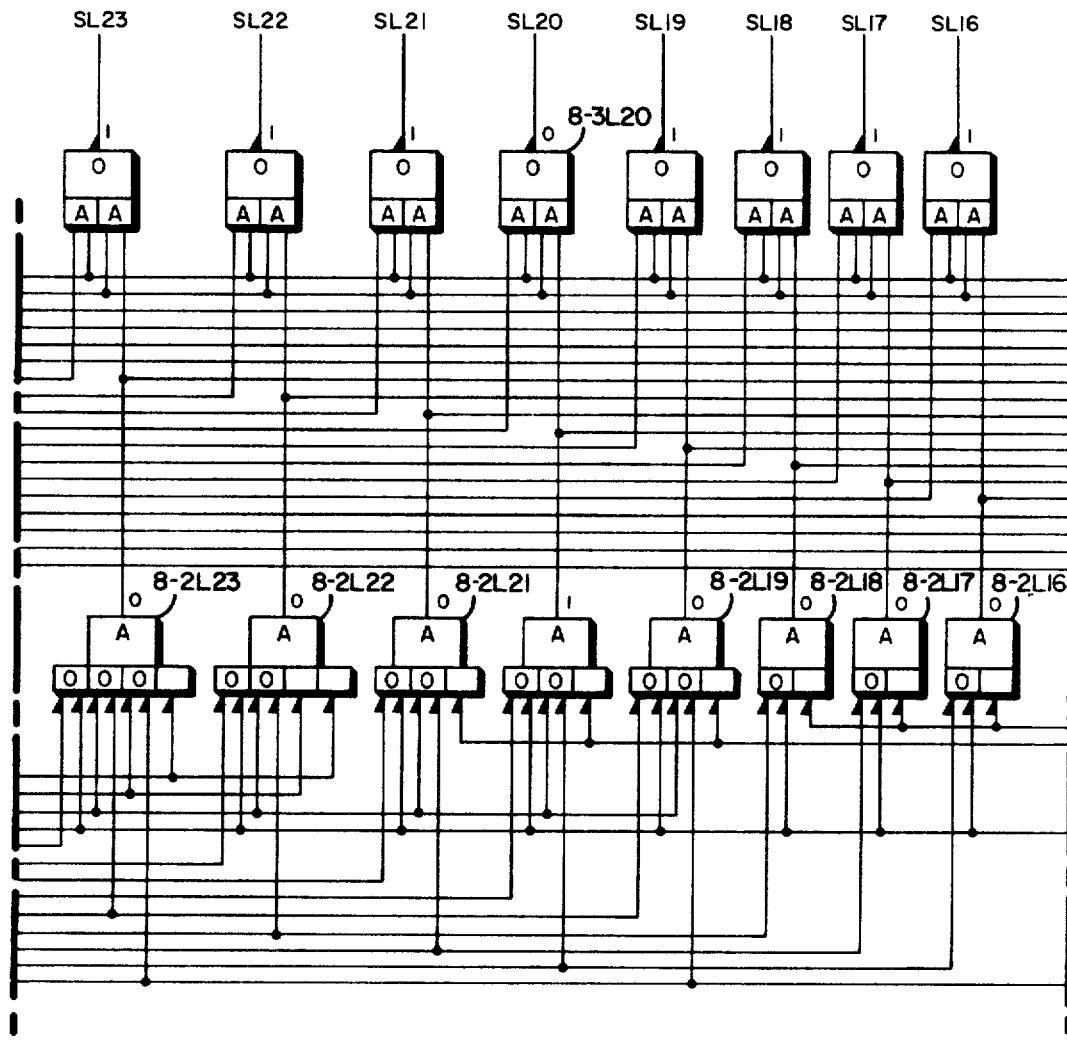
Figure 8H:
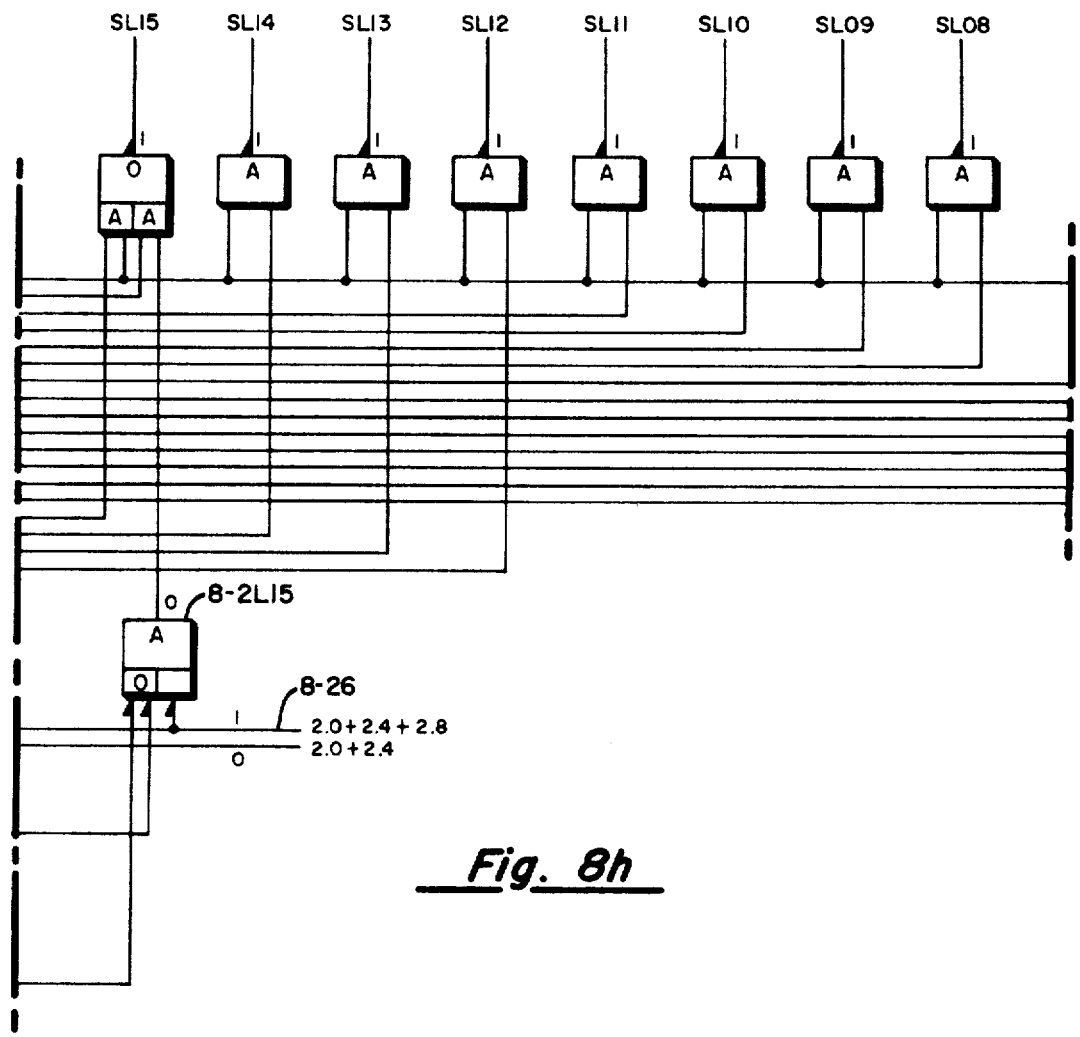
Figure 8I:
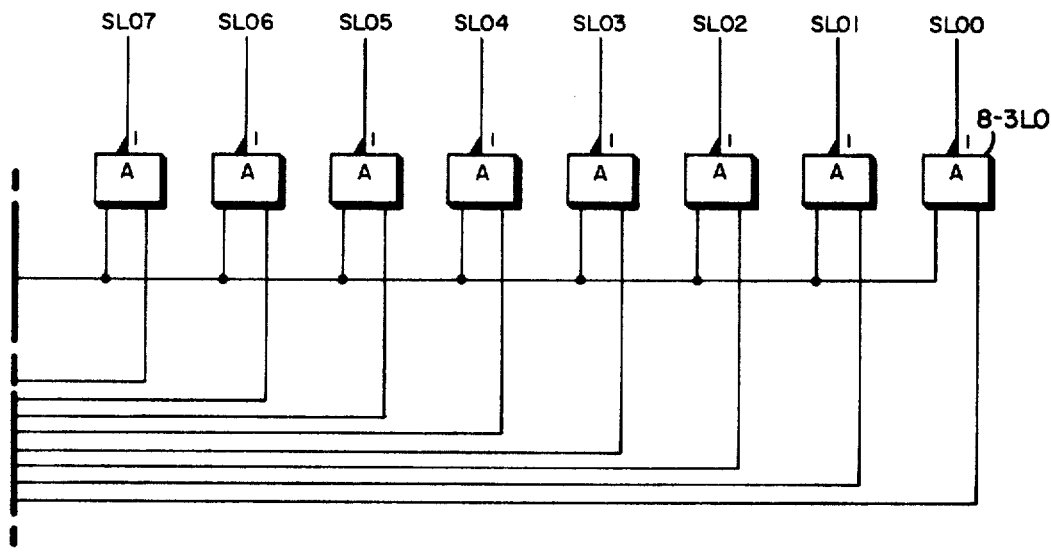

FIGS. 5a and 5b when arranged according to the layout of FIG. 5 illustrate a block diagram of the Shift Count Modifier 26 of the present invention. The Shift Count Modifier 26 receives as inputs the shift count CØ from CØ Register 28 providing as outputs 2 "modified" shift counts, each in the form of a 5-bit word, that are coupled to the Shift Count Generator 24; and, 6 shift count magnitude outputs, each in the form a 1-bit word, that are coupled to the Shifter Control 46. As discussed in the section Theory of Operation under the heading Shift Count Modification the Shift Count Modifier 26 operates upon the shift count CØ to generate all possible shift count modifications (4) in parallel coupling only one modified shift count to the Shift Enable Generator 24 as determined by the shift count magnitude and direction. The modified shift count signals are, in the illustrated embodiment, generated by acting upon the shift count in parallel using three adders designated the $\mp 1$ adder, the $+2$ adder, the $\mp 3$ adder; the fourth "modified" shift count output is actually unmodified by any adder, it being equal to the shift count CØ as held in the CØ register 28 and being utilized as the "modified" shift count for a right shift of $CØ<30$. To better understand the operation of the Shift Count Modifier 26 of FIGS. 5a and 5b the symbolic block diagram of Shift Count Modifier 26 is illustrated in FIG. 6. Further, to better exemplify the operation of the present invention the operation thereof shall be discussed using Instruction Code 02 Right Shift A with a shift count CØ of 10; in other words, a shifting operation consisting of shifting the contents of A Register 40 10 bits to the right.

With particular reference to FIG. 6 there is illustrated CØ register 6-28 containing the binary number 001010, bits $2^5-2^0$, which binary number is equivalent to the decimal number 10 representing a shift count of 10. The true and the complement of bits $2^5-2^0$, where $CØ_{00}$ represents the true of $2^0$ and $\overline{CØ}_{00}$ represents the complement of $2^0$, are coupled to the $+0$ Adder 6–8, $\mp 1$ Adder 6–10, $+2$ Adder 6–12 and $\mp 3$ Adder 6–14 in a specific combination as exemplified by FIGS. 5a and 5b to provide the four modified shift counts of the shift count held in CØ Register 6–28. Note: as discussed above the $+0$ Adder 6–8 is non-existent as the shift count is unmodified thereby but is illustrated here merely for ease of discussion. These four modified shift counts are in turn coupled to associated And gates 6–16, 6–18, 6–20 and 6–22 which And gates are enabled by an associated $CØ<30$ signal at And gates 6–16 and 6–18 and a $CØ \geqslant 30$ at And gates 6–20 and 6–22. The enabled And gates, which in the instant illustration with $CØ<30$ would be And gates 6–16 and 6–18, would coupled their associated modified shift counts 0101 and 1010, respectively, to the associated Or inverters 6–32 and 6–34, respectively. Depending upon whether a right shift LH or a left shift RH operation has been designated by the instruction code the associated complemented modified shift count would be gated into the Shift Enable Generator 6–24, by a right shift RH enable on line 6–36 or a left shift LH enable on line 6–38, from right shift Or inverter 6–32 or left shift Or inverter 6–38. As the illustrated operation is for an Instruction Code 02 Right Shift A with a shift count of 10 it is apparent that the "modified" shift count 0101 would pass through And gate 6–20, be complemented by Or inverter 6–32 and thence into Shift Enable Generator 6024 in its complemented form. Additionally, the true and the complement of bit $2^0$, $CØ_{00}$ and $\overline{CØ}_{00}$, are unconditionally coupled to Shift Enable Generator 26 from CØ Register 6–28.

In summation then it may be stated that the Shift Count Modifier:

(1) Generates from the shift count held in CØ Register four parallel modified shift counts, each of 4-bits in length using only $2^4-2^1$ of the modified shift count:

(a) The true of the shift count $+0$ or $-$
(b) The complement of the shift count $+1$ or $+\overline{1}$
(c) The true of the shift count $+2$ or $+2$
(d) The complement of the shift count $+3$ or $+\overline{3}$ (2) Depending upon the magnitude of the shift count two of the modified shift counts are gated through to the Shift Enable Generator (SEG):

(a) If Right Shift and | Modified Shift Count to SEG
--- | ---
$CØ < 30$ | $-$
$CØ \leq 30 < 60$ | $+2$
$CØ \geq 60$ | $-$ (b) If Left Shift and | Modified Shift Count to SEG
--- | ---
$CØ = 0$ | $-$
$0 < CØ \leq 30$ | $+\overline{1}$
$30 < CØ \leq 60$ | $+\overline{3}$
$60 < CØ$ |

(3) Depending upon the direction of the shift one of the two modified shift counts is gated into the SEG:

Using the above rules with a shift count of 10:

|  | $2^5$ | $2^4$ | $2^3$ | $2^2$ | $2^1$ | $2^0$ |
|---|---|---|---|---|---|---|
| 1. The shift count CØ held in the CØ register  CØ=0 | 0 | 1 | 0 | 1 | | 0 |
| 2. The true of CØ+0  CØ +0 | 0 | 0 | 1 | 0 | 1 | 0 |
|  | 0 | 0 | 1 | 0 | 1 | 0 |
| 3. The complement of CØ+1  CØ +1 | 0 | 0 | 1 | 0 | 1 | 0 |
|  |  |  |  |  |  | 1 |
|  | 0 | 0 | 1 | 0 | 1 | 1 |
| complement | 1 | 1 | 0 | 1 | 0 | 0 |
| 4. The true of CØ+2  CØ +2 | 0 | 0 | 1 | 0 | 1 | 0 |
|  |  |  |  |  | 1 | 0 |
|  | 0 | 0 | 1 | 1 | 0 | 0 |

5. The complement of $C\emptyset+3$

```
Cø    0  0  1  0  1  0
+3                1  1
      ─────────────────
      0  0  1  1  0  1
``` complement  1 | 1 0 0 1 | 0

These 4-bit words are as shown in FIG. 6 alongside their respective adders 6–8, 6–10, 6–12 and 6–14.

With the discussion of FIG. 6 it was shown that a shift count $C\emptyset=001010$ in $C\emptyset$ Register 6–28 would produce two 4-bit groups of binary numbers ($0101=RH$; $1010=LH$). At the Shift Enable Generator 6–24 and true (0) of bit $C\emptyset_{00}$ is added as the lowest ordered bit to each of these 4-bit words producing in effect a 5-bit word 01010 representing the modified shift count for a right shift of 10 and a 5-bit word 10100 representing the modified shift count for a left shift of 20. These 4-bit words are coupled to Shift Enable Generator 6–24 in their complemented form for logic simplification of FIGS. 5a and 5b; where,

|  | $2^4$ | $2^3$ | $2^2$ | $2^1$ |
|---|---|---|---|---|
| Right Shift Count of 10 | =0 | 1 | 0 | 1 |
| Complement | =1 | 0 | 1 | 0 |
| e.g., $\overline{RH_{01}}=0$ | | | | |
| Left Shift Count of 20 | =1 | 0 | 1 | 0 |
| Complement | =0 | 1 | 0 | 1 |
| e.g., $\overline{LH_{01}}=1$ | | | | |

Referring back now to FIGS. 5a and 5b their operation will be discussed using the assumed Instruction Code 02 Right Shift A with a shift count of 10. Thus, with $C\emptyset$ Register 28 holding a shift count $C\emptyset=001010$ the output of the $C\emptyset$ Register 28 shall be as follows:

| $2^5=0$ | $2^4=0$ | $2^3=1$ | $2^2=0$ | $2^1=1$ | $2^0=0$ |
|---|---|---|---|---|---|
| $C\emptyset_{05}=0$ | $C\emptyset_{04}=0$ | $C\emptyset_{03}=0$ | $C\emptyset_{02}=0$ | $C\emptyset_{01}=1$ | $C\emptyset_{00}=0$ |
| $\overline{C\emptyset_{05}}=1$ | $\overline{C\emptyset_{04}}=1$ | $\overline{C\emptyset_{03}}=0$ | $\overline{C\emptyset_{02}}=1$ | $\overline{C\emptyset_{01}}=0$ | $\overline{C\emptyset_{00}}=1$ |

Applying these input signals to the Shift Count Modifier as implemented by the logic of FIGS. 4a–4e the following output signals, as discussed with respect to FIG. 6, are provided and coupled to the Shift Enable Generator:

Right Shift Count of 10;

$$\overline{RH_{04}}=1 \quad \overline{RH_{03}}=0 \quad \overline{RH_{02}}=1 \quad \overline{RH_{01}}=0$$

Left Shift Count of 20;

$$\overline{LH_{04}}=0 \quad \overline{LH_{03}}=1 \quad \overline{LH_{02}}=0 \quad \overline{LH_{01}}=1$$

The true and the complement of bit $2^0$ of $C\emptyset$ Register:

$$C\emptyset_{00}=0 \quad \overline{C\emptyset_{00}}=1$$

Additionally, the following Shift Count Magnitude Designators are generated and coupled to the Shifter Control:

$C\emptyset<30=1 \quad C\emptyset>30=0$
$C\emptyset\leq30=1 \quad C\emptyset\geq30=0$
$C\emptyset<60=1 \quad C\emptyset\geq60=0$ These Shift Count Magnitude Designators are utilized at the Shifter Control to gate the shifted operand from the SU and/or SL into the A and/or Q Register(s) as determined by the Instruction Code $f$ in the Instruction Register—see previous discussion of Table H.

Referring to FIG. 7 in which there is illustrated the Shift Enable Generator as implemented by the logic of FIGS. 4a–4e the above noted input signals from the Shift Count Modifier and the Shift Direction Enables from the Instruction Translator:

$$RH=1 \quad LH=0$$

provide the following output signals to the Shifter:

Level 1

$1.0=0 \quad 1.1=0 \quad 1.2=1 \quad 1.3=0$ $1.2+1.3=1 \quad 1.1+2+1.3=1$

Level 2

$2.0=0 \quad 2.4=0 \quad 2.8=1 \quad 2.12=0$ $2.0+2.4=0 \quad 2.0+2.4+2.8=1 \quad 2.8+2.12=1$

Level 3

$3.0=1 \quad 3.16=0$

The combinational signals, e.g., $1.2+1.3=1$ and $2.0+2.4=0$, coupled to levels 1 and 2 are utilized by the Shifter to provide sign extension capabilities. Thus, it can be seen that by enabling, i.e., coupling a 1 thereto, Shift Enable signals 1.2, 2.8 and 3.0 the operand would be shifted through the Shifter 10 places right:

$1.2=$ Right Shift of 2
$2.8=$ Right Shift of 8
$3.0=$ Right Shift of 0
───
Total Right Shift of 10

With reference again to FIGS. 5a and 5b the above illustrative example of Instruction Code 02 Shift Right A with a shift count of 10 has been diagrammed. Noted combinations of 1's and 0's using the outputs of the $C\emptyset$ Register as the sole inputs exemplify the operation of the logical elements of FIGS. 4a–4e in the preferred embodiment of the Shift Count Modifier of the present invention. As the logical operations are straightforward it is believed that the illustrated example is sufficient to provide an understanding of its operation. Accordingly, no unnecessary detailed description shall be set forth herein.

With particular reference to FIG. 7 there is illustrated a block diagram of the Shift Enable Generator 24 of the present invention. As with FIGS. 5a and 5b, the noted combinations of 1's and 0's, using the output of the Shift Count Modifier and the Shift Direction Enables RH and LH from the Instruction Translator, exemplify the operation of the logic elements of FIGS. 4a–4e in the preferred embodiment of the Shift Enable Generator of the present invention. As the logical operations are straightforward it is believed that the illustrated example is sufficient to provide an understanding of its operation. Accordingly, no unnecessary detailed description shall be set forth herein. An inspection of the logic of FIGS. 5a, 5b and 7 indicates that the Shift Enable signals that are coupled to the Shifter and that the Shift Count Magnitude Designators that are coupled to the Shifter Control are as previously outlined.

FIGS. 8a–8i when arranged according to the layout of FIG. 8 illustrate a block diagram of the Shifter 30 of the present invention. The Shifter 30 receives as inputs:

(1) The true of the bits $2^{29}$–$2^0$ of the $D\emptyset$ or D1 Registers, which bits represent the operand that is to be shifted through the Shifter 30.

(2) The Shift Enable signals: 1.0, 1.1, 1.2, and 1.3 coupled to level 1; 2.0, 2.4, 2.8, and 2.12 coupled to level 2; and 3.0 and 3.16 are coupled to level 3.

(3) The Sign Extension Combination Shift Enable signals; $1.2+1.3$ and $1.1+1.2+1.3$ coupled to level 1; and, $2.0+2.4$, $2.0+2.4+2.8$, and $2.8+2.12$ coupled to level 2.

(4) The Sign Enable signals: Sign Enable, coupled to Levels 1 and 3; and $\overline{\text{Sign Enable}}$, the complement of the Sign Enable signal, coupled to Level 2.

The shifter 30 provides as outputs:

(1) The complement of the bits $2^{29}$–$2^{30}$ of the operand at output terminals SU29–SU0 and SL29–SL0 as determined by the instruction Code and the shift count.

(2) The complement of the sign-filled bits of the operand at output terminals SU29–SU0 and SL29–SL0 as determined by the instruction code and the Shift Count.

With particular reference to FIG. 9 there is illustrated the diagram of the flow of an operand:

10000100001000010000100001000010001 held in the $D\emptyset$ Register, as it flows through levels 1, 2 and 3 of the Shifter 30 and out into A Register 40 as directed by the previously chosen Instruction Code 02 Right Shift A with a shift count of 10. As shown and discussed above with reference to Table H this instruction sign-fills, in accordance with the sign bit $D\emptyset_{29}$, the bits that are vacated by the right shift operation. Accordingly, with bit $D\emptyset_{20}=1$ in the above exemplary operand it is apparent that upon completion of the shift operation the A Register should contain the following shifted operand:

11111111111000010000100010000

In the exemplary flow of the operand from the $D\emptyset$ Register into the A Register of FIG. 9 only the flow of the 1's has been diagrammed, it being understood that the 0's flow in a like manner. This diagram is presented to better understand the operation of the Shifter 30 of FIGS. 8a–8i; the flow of 1's (and 0's) illustrating the positional relationship of the ordered bits of the operand as it flows through the Shifter 30. As the logic elements used, those of FIGS. 4a–4e, perform a logic inversion it can be appreciated that a 1 or a 0 in $D\emptyset$ Register is inverted an odd number (3) of times when passing from Level 1 to Level 3 being emitted therefrom in the inverted, or complemented, form. Accordingly, a 1 coupled to bit 29 of Level 1 by $D\emptyset_{29}$ is complemented as a 0 into bit 27 of Level 2, is complemented again as a 1 into bit 19 of Level 3 and is emitted from Level 3 as a 0. Thus, the output of Level 3 is the input to Level 1 complemented and shifted as determined by the shift magnitude and direction.

With particular reference to FIGS. 8a–8i there is illustrated the arrangement of the logic elements of FIGS. 4a–4e to achieve the unidirectional shift matrix of Shifter 30 of FIG. 1. With the bits of the above noted exemplary operand coupled to their respectively associated input lines $2^{29}$–$2^0$ of Level 1 the flow of the respectively associated bits through Shifter 30 is as noted by the 1's and 0's at the outputs of the associated logic elements. At Level 1 Shift Enable 1.2 line 8–10, Sign Enable line 8–12 and Combination Sign Enable 1.2+1.3 line 8–14 and explained above. The 1 on line 8–10 gates the 1's on input 1.1+1.2+1.3 line 8–16 have 1's coupled thereto as lines $2^{29}$, $2^{24}$, $2^{19}$, $2^{14}$, $2^9$, $2^4$, and $2^0$ into elements 8–1U27, 8–1U22, 8–1U17, 8–1U12, 8–1U7, 8–1U2, and 8–1L28 causing each of such elements to emit and couple a 0 into Level 2. Additionally, the 1 on line 8–12 gates the 1 on line 8–16 into element 8–1U29 and the 1 on line 8–14 into element 8–1U28 sign-filling these elements as determined by $D\emptyset^{29}$ causing them to emit and couple a 0 into Level 2. All other elements of Level 1 emit and couple a 1 to Level 2.

At Level 2 Shift Enable 2.8 line 8–20, Combination Sign Enable 2.8+2.12 line 8–22, 2.4+2.12 line 8024 and 2.0+2.4+2.8 line 8–26 have 1's coupled thereto as explained above. Additionally, $\overline{\text{Sign Enable}}$ line 8–28 has a 0 coupled thereto (the complement of the 1 that is coupled to the Sign Enable line 8–12 of Level 1). The 1 on line 8–20 gates the 1's emitted from Level 1 into elements 8–2U18 through 8–2U15, 8–213 through 8–2U10, 8–2U8 through 8–2U5, 8–2U3 through 8–2U0, 8–2L28 through 8–2L25, and 8–2L23 through 8–2L21 causing each of such elements to emit and couple a 0 into Level 3. The 1 on line 8–26 gates (actually being a forcing input) a 1 through elements 8–2L18 through 8–2L15 forcing them to emit and couple a 0 to Level 3. All other elements on Level 2 emit and couple a 0 to Level 3. Note that elements 8–2U29 through 8–2U19 emit and couple 1's to Level 3 sign-filling the upper order 10 bits of the operand in Level 2.

At Level 3 Shift Enable 3.0 line 8–30 and Sign Enable line 8–32 have 1's coupled thereto as explained above. The 1 on line 8–30 gates the 1's emitted from Level 2 into elements 8–3U29 through 8–3U19, 8–3U14, 8–3U9, 8–3U4, 8–3L29, 8–3L24 and 8–3L20 causing each of such elements to emit to emit a 1 from Level 3. All other elements 70 emit a 1 from Level 3. Note that elements 8–3U29 through 8–3U19 emit a 0 representative of the sign-filling of the upper order 10 bits of the operand in Level 3, such operand having been shifted 10 bits to the right with a sign bit $D\emptyset_{29}$ of 1.

Accordingly, it can be seen that Shifter Upper SU of Level 3 emits the shifted operand from the $D\emptyset$ register, as a multi-bit word,

0111011101111111111111111111111 while the Shifter Lower SL of Level 3 emits the multi-bit word

0111011101111111111111111111111 both multi-bits words being in their complemented form. Complementing the shifted operand held in Shifter Upper SU,

11111111111000010000100010000 provides the expected form as discussed initially with respect to FIG. 9.

Thus, it is apparent that there has been described and illustrated herein a preferred embodiment of the present invention that provides a novel shifting algorithm and implementation means therefore providing an improved shifting operation. It is understood that suitable modifications may be made in the structure as disclosed provided that such modifications come within the spirit and scope of the appended claims. Having, now, fully illustrated and described our invention, what we claim to be new and desire to protect by Letters Patent is set forth in the appended claims.

We claim:

1. A shift algorithm implementation means, comprising:

a shift count modifier means for the concurrent generation of four shift counts for the shifting of a multi-bit operand of $a$-bits in length;

means for coupling the bits of a multi-bit shift count $C\emptyset$ to said shift count modifier means;

said shift count modifier means including;

first means for generating an unmodified first shift count $C\emptyset$;

second means for generating a modified second shift count, $$C\emptyset + (2^M - a)$$

where M is a positive integer defined by the relationship, $$2^M \geq a$$

third means for generating a modified third shift count, $$C\emptyset + (2^M - a - 1)$$

fourth means for generating a modified fourth shift count $$C\emptyset + (2^{M+1} - 2a - 1)$$

shift count magnitude determination means for generating the signals, $$C\emptyset \geq a, \text{ or}$$

$$C\emptyset < a; \text{ and}$$

modified shift count selector means for causing said signal $C\emptyset < a$ to select said first shift count and said third shift count $C\emptyset + (2^M - a - 1)$ or for causing said signal $C\emptyset \geq a$ to select said second shift count $C\emptyset + (2^{M-a})$ and said fourth shift count $$C\emptyset + (2^{M+1} - 2a - 1)$$

2. The shift algorithm implementation means of claim 1 further including:

shift direction means for providing first and second shift direction signals; and, shift enable generator means responsively coupled to said shift direction means and said shift count modifier means for generating a plurality of shift enable signals.

3. The shift algorithm implementation means of claim 2 further including:

a unidirectional shift matrix having first, second and third logic levels for shifting said multi-bit operand of single length $a$ at said first level into a double length $2a$ output at said third level;
an input register for holding said operand;
means coupling said input register to said shift matrix; and
means coupling said shift enable signals to said shift matrix for causing said operand to be shifted through said shift matrix as determined by said first or second shift direction signal and said first, second, third or fourth shift count.

4. A shift algorithm implementation means, comprising:
a shift count modifier means for the concurrent generation of four shift counts for the shifting of a multi-bit operand of a-bits in length;
means for coupling the bits of a multi-bit shift count $C\emptyset$ to said shift count modifier means;
said shift count modifier means including means for generating an unmodified first shift count $C\emptyset$, a modified second shift count $C\emptyset + (2^M - a)$ where M is a positive integer defined by the relationship $2^M \geq a$, a modified third shift count $C\emptyset + (2^M - a - 1)$, a modified fourth shift count $C\emptyset + (2^{M+1} - 2a - 1)$, and further including a shift count magnitude determination means for generating the signals $C\emptyset \geq a$, or $C\emptyset < a$;
modified shift count selector means for causing said signal $C\emptyset < a$ to select said first shift count and said third shift count or for causing said signal $C\emptyset \geq a$ to select said second shift count and said fourth shift count.

5. The shift algorithm implementation means of claim 4 further including:
shift direction means for providing first and second shift direction signals; and,
shift enable generator means responsively coupled to said shift direction means and said shift count modifier means for generating a plurality of shift enable signals.

6. The shift algorithm implementation means of claim 5 further including:
a shift matrix having a plurality of logic levels for shifting said multi-bit operand of single length $a$ at a first level into a double length $2a$ output at a fast level;
an input register for holding said operand;
means coupling said input register to said shift matrix; and,
means coupling said shift enable signals to said shift matrix for causing said operand to be shifted through said shift matrix as determined by said first or second shift direction signal and said first, second, third or fourth shift count.

7. A shift algorithm implementation means, comprising:
a shift count modifier means for the concurrent generation of four shift counts for the shifting of a multi-bit operand of $a$-bits in length;
shift count register means for coupling the bits of a multi-bit shift count $C\emptyset$ to said shift count modifier means; and
shift count magnitude determination means for selecting two of said four shift counts.

8. The shift algorithm implementation means of claim 7 further including:
shift direction means for providing a left or a right shift direction signal; and,
shift enable generator means responsively coupled to said shift direction means and said shift count modifier means for selecting one of said two selected shift counts as determined by the coupling of said left or right shift direction signal thereto, said one selected shift count generating a plurality of unique shift enable signals.

9. The shift algorithm implementation means of claim 8 further including:

a unidirectional shift matrix having first, second and third logic levels for shifting said multi-bit operand of single length $a$ at said first level into a double length $2a$ output at said third level;
an input register for holding said operand;
means coupling said input register to said shift matrix; and,
means coupling said unique shift enable signals to said shift matrix for causing said operand to be shifted through said shift matrix as determined by said left or right shift direction signal and said one selected shift count.

10. A shift algorithm implementation means, comprising:
shift count modifier means adapted to receive the bits of a multi-bit shift count $C\emptyset$, said shift count modifier means including, $+0$ adder means
$+\overline{1}$ adder means
$+2$ adder means
$+\overline{3}$ adder means each of said adder means operatively effecting said shift count $C\emptyset$ for concurrently generating an associated shift count.

11. The shift algorithm implementation means of claim 10 further including:
shift count magnitude determination means responsively coupled to the bits of said multi-bit shift count $C\emptyset$ for selecting two of said four associated shift counts.

12. The shift algorithm implementation means of claim 11 further including:
instruction translator means for generating right or left shift enable generator means responsively coupled to said right or left shift direction designator signals for selecting one of said two selected associated shift counts and generating an associated plurality of shift enable signals.

13. A shift algorithm implementation means comprising:
a shift count modifier means for the concurrent generation of four shift counts for the shifting of a multi-bit operand of $a$-bits in length;
shift count register means for coupling the bits of a multi-bit shift count $C\emptyset$ to said shift count modifier means;
said four shift counts comprising:
a first shift count of a first direction and of a shift count $C\emptyset < a$;
a second shift count of said first direction and of a shift count $C\emptyset \geq a$;
a third shift count of a second direction and of a shift count $C\emptyset < a$; and
a fourth shift count of said second direction and of a shift count $C\emptyset \geq a$.

14. The shift algorithm implementation means of claim 13 further including:
shift count magnitude determination means responsively coupled to the bits of said multi-bit shift count $C\emptyset$ for generating first and second shift count magnitude designator signals $C\emptyset < a$ or $C\emptyset \geq a$, respectively.

15. The shift algorithm implementation means of claim 14 further including:
instruction translator means for generating first or second shift direction designator signals; and
shift enable generator means responsively coupled to said first, and third or said second and fourth shift counts, said first or second shift magnitude designator signals, and said first or second shift direction designator signals for generating a plurality of shift enable signals corresponding to a selected one of said first, second, third, or fourth shift counts.

(References on following page)

References Cited

UNITED STATES PATENTS

| | | | |
|---|---|---|---|
| 3,076,181 | 1/1963 | Newhouse et al. | 340—174 |
| 3,192,363 | 6/1965 | MacSorley | 235—164 |
| 3,210,737 | 10/1965 | Perry et al. | 340—172.5 |
| 3,214,738 | 10/1965 | Parrott | 340—172.5 |
| 3,274,556 | 9/1966 | Paul et al. | 340—172.5 |
| 3,350,692 | 10/1967 | Cagle et al. | 340—172.5 |
| 3,374,463 | 3/1968 | Muir | 340—172.5 |

ROBERT C. BAILEY, *Primary Examiner.*

R. B. ZACHE, *Assistant Examiner.*

UNITED STATES PATENT OFFICE
CERTIFICATE OF CORRECTION

Patent No. 3,436,737                                                     April 1, 1969

Gary J. Iverson et al.

It is certified that error appears in the above identified patent and that said Letters Patent are hereby corrected as shown below:

Column 23, line 43, "fast" should read -- last --. Column 24, between lines 34 and 35 insert -- shift direction designator signals; and, --.

Signed and sealed this 7th day of April 1970.

(SEAL)
Attest:

Edward M. Fletcher, Jr.                                WILLIAM E. SCHUYLER, JR.
Attesting Officer                                             Commissioner of Patents